United States Patent
Park et al.

(10) Patent No.: US 9,826,117 B2
(45) Date of Patent: Nov. 21, 2017

(54) IMAGE FORMING APPARATUS SUPPORTING WI-FI DIRECT AND METHOD OF ACTIVATING WI-FI DIRECT

(71) Applicant: S-PRINTING SOLUTION CO., LTD., Suwon-si, Gyeonggi-do (KR)

(72) Inventors: Sung-joon Park, Hwaseong-si (KR); Jin-hyung Kim, Suwon-si (KR); Hyun-wook Park, Suwon-si (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 0 days.

(21) Appl. No.: 15/239,391

(22) Filed: Aug. 17, 2016

(65) Prior Publication Data

US 2016/0360066 A1    Dec. 8, 2016

Related U.S. Application Data

(63) Continuation of application No. 14/686,263, filed on Apr. 14, 2015, which is a continuation of application
(Continued)

(51) Int. Cl.
*H04N 1/327* (2006.01)
*G06F 3/12* (2006.01)
(Continued)

(52) U.S. Cl.
CPC ....... *H04N 1/32797* (2013.01); *G06F 3/1204* (2013.01); *G06F 3/1236* (2013.01);
(Continued)

(58) Field of Classification Search
CPC ..................................................... G06K 15/40
(Continued)

(56) References Cited

U.S. PATENT DOCUMENTS

| 7,634,801 B2 | 12/2009 | Kizawa |
| 8,494,502 B2 | 7/2013 | Abel et al. |

(Continued)

FOREIGN PATENT DOCUMENTS

| CN | 101185253 | 5/2008 |
| CN | 101770665 | 7/2010 |

(Continued)

OTHER PUBLICATIONS

U.S. Office Action dated Apr. 23, 2014 from U.S. Appl. No. 13/712,220.
(Continued)

*Primary Examiner* — Thomas Lett
(74) *Attorney, Agent, or Firm* — Staas & Halsey LLP

(57) ABSTRACT

An image forming apparatus supporting peer to peer (P2P) connection includes a print engine to perform a print operation; a first wireless interface to connect the image forming apparatus to an access point (AP) of an infrastructured network; a second wireless interface to connect the image forming apparatus to an external mobile device by P2P; a soft AP module to allow the image forming apparatus to perform as an AP when the image forming apparatus is P2P connected; a dynamic host configuration protocol (DHCP) server unit to allocate an internet protocol (IP) address to the mobile device that is P2P connected to the image forming apparatus; a soft AP activating unit to activate the soft AP module; and a control unit. If a discovery packet is received from the mobile device via P2P interface, the control unit is operable to control the image forming apparatus to process the discovery packet.

16 Claims, 20 Drawing Sheets

Related U.S. Application Data

No. 13/712,138, filed on Dec. 12, 2012, now Pat. No. 9,036,169.

(60) Provisional application No. 61/569,391, filed on Dec. 12, 2011.

(51) Int. Cl.
| | | |
|---|---|---|
| *G06K 15/00* | (2006.01) | |
| *H04W 76/02* | (2009.01) | |
| *H04N 1/00* | (2006.01) | |
| *H04W 8/00* | (2009.01) | |

(52) U.S. Cl.
CPC .......... *G06F 3/1292* (2013.01); *G06F 3/1296* (2013.01); *G06K 15/00* (2013.01); *G06K 15/4005* (2013.01); *G06K 15/4045* (2013.01); *H04N 1/00204* (2013.01); *H04N 1/00214* (2013.01); *H04N 1/00307* (2013.01); *H04N 1/00954* (2013.01); *H04W 8/005* (2013.01); *H04W 76/023* (2013.01); *H04W 76/025* (2013.01); *H04N 2201/0015* (2013.01); *H04N 2201/0039* (2013.01); *H04N 2201/0041* (2013.01); *H04N 2201/0055* (2013.01); *H04N 2201/0094* (2013.01); *Y02B 60/1271* (2013.01)

(58) Field of Classification Search
USPC ........................................................ 358/1.15
See application file for complete search history.

(56) References Cited

U.S. PATENT DOCUMENTS

| | | | |
|---|---|---|---|
| 8,621,071 B1 | 12/2013 | Scofield et al. | |
| 8,625,488 B1 | 1/2014 | Gogate et al. | |
| 8,749,823 B2 | 6/2014 | Kato | |
| 8,873,468 B1 | 10/2014 | Gogate et al. | |
| 8,929,822 B2 | 1/2015 | Jung et al. | |
| 8,947,712 B2 | 2/2015 | Arai | |
| 9,313,315 B2 | 4/2016 | Choi et al. | |
| 2003/0149778 A1 | 8/2003 | Robinson et al. | |
| 2003/0156567 A1 | 8/2003 | Oak | |
| 2004/0176134 A1 | 9/2004 | Goldthwaite et al. | |
| 2005/0130647 A1 | 6/2005 | Matsuda et al. | |
| 2005/0146744 A1 | 7/2005 | McAllister et al. | |
| 2005/0147049 A1 | 7/2005 | Ganesan | |
| 2005/0279833 A1 | 12/2005 | Tanaka | |
| 2006/0206592 A1 | 9/2006 | Fujii et al. | |
| 2007/0139693 A1 | 6/2007 | Lodolo | |
| 2008/0063002 A1 | 3/2008 | Zheng et al. | |
| 2008/0225331 A1 | 9/2008 | Jung | |
| 2008/0288936 A1 | 11/2008 | Ikeda | |
| 2009/0017843 A1 | 1/2009 | Laroia et al. | |
| 2009/0052348 A1 | 2/2009 | Kato | |
| 2010/0082490 A1 | 4/2010 | Rosenblatt et al. | |
| 2010/0322213 A1 | 12/2010 | Liu et al. | |
| 2011/0010246 A1* | 1/2011 | Kasslin | G06Q 30/0267 705/14.64 |
| 2011/0026504 A1 | 2/2011 | Feinberg | |
| 2011/0063663 A1 | 3/2011 | Kim et al. | |
| 2011/0082905 A1 | 4/2011 | Wentink et al. | |
| 2011/0082939 A1 | 4/2011 | Montemurro et al. | |
| 2011/0082940 A1 | 4/2011 | Montemurro et al. | |
| 2011/0085529 A1 | 4/2011 | Choi et al. | |
| 2011/0096354 A1 | 4/2011 | Liu | |
| 2011/0185183 A1* | 7/2011 | Yamamoto | G06F 21/33 713/182 |
| 2011/0225305 A1 | 9/2011 | Vedantham et al. | |
| 2011/0231922 A1 | 9/2011 | Azuma | |
| 2011/0292425 A1 | 12/2011 | Lee | |
| 2012/0034868 A1 | 2/2012 | Fine | |
| 2012/0224569 A1 | 9/2012 | Kubota | |
| 2013/0044635 A1* | 2/2013 | Suzuki | H04W 76/023 370/254 |
| 2013/0057897 A1 | 3/2013 | Park et al. | |
| 2013/0057898 A1 | 3/2013 | Park et al. | |
| 2013/0148149 A1 | 6/2013 | Park et al. | |
| 2013/0215467 A1 | 8/2013 | Fein et al. | |
| 2013/0229685 A1 | 9/2013 | Naruse | |
| 2013/0258402 A1 | 10/2013 | Arai | |
| 2014/0047038 A1 | 2/2014 | Piratla et al. | |
| 2014/0347170 A1 | 11/2014 | Gui et al. | |
| 2015/0055174 A1 | 2/2015 | Baba | |
| 2015/0172924 A1 | 6/2015 | Hirano | |
| 2017/0026783 A1 | 1/2017 | Asakura | |

FOREIGN PATENT DOCUMENTS

| | | |
|---|---|---|
| CN | 101958026 | 1/2011 |
| CN | 202019354 | 10/2011 |
| CN | 102356627 | 2/2012 |
| CN | 102891706 | 1/2013 |
| CN | 103369171 | 10/2013 |
| CN | 103577849 | 2/2014 |
| EP | 2 239 924 | 10/2010 |
| EP | 2390782 | 11/2011 |
| EP | 2 645 691 A2 | 10/2013 |
| EP | 2 811 720 A2 | 12/2014 |
| EP | 2 840 529 | 2/2015 |
| KR | 10-2005-0073509 | 7/2005 |
| KR | 10-2011-0040025 | 4/2011 |
| KR | 10-2011-0096831 | 8/2011 |
| KR | 10-2013-0025745 | 3/2013 |
| KR | 10-2013-0025747 | 3/2013 |
| KR | 10-2013-0025749 | 3/2013 |
| WO | 2009/009394 | 1/2009 |

OTHER PUBLICATIONS

U.S. Notice of Allowance dated Jan. 15, 2016 from U.S. Appl. No. 13/712,220.
U.S. Notice of Allowance dated Oct. 6, 2015 from U.S. Appl. No. 13/712,220.
U.S. Notice of Allowance dated Apr. 13, 2015 from U.S. Appl. No. 13/712,220.
U.S. Notice of Allowance dated May 28, 2014 from U.S. Appl. No. 13/712,256.
U.S. Office Action dated Jan. 4, 2016 from U.S. Appl. No. 14/471,611.
U.S. Notice of Allowance dated Dec. 18, 2015 from U.S. Appl. No. 14/471,611.
U.S. Notice of Allowance dated Jun. 22, 2015 from U.S. Appl. No. 14/471,611.
U.S. Notice of Allowance dated Feb. 27, 2015 from U.S. Appl. No. 14/471,611.
U.S. Notice of Allowance dated Nov. 7, 2014 from U.S. Appl. No. 14/471,611.
Inventek Systems, "eS-WiFi Module Application Note AN20052", Software Enabled Access Point (SoftAP) Functionality, 2012, 12 pages.
U.S. Office Action dated Mar. 28, 2016 from U.S. Appl. No. 14/592,483.
U.S. Office Action dated Jun. 3, 2015 from U.S. Appl. No. 14/676,182.
U.S. Notice of Allowance dated Sep. 22, 2015 from U.S. Appl. No. 14/676,182.
Extended European Search Report dated Jul. 7, 2016 from European Patent Application No. 16166088.1, 5 pages.
Extended European Search Report dated Feb. 8, 2016 from European Patent Application No. 15162047.3, 6 pages.
"Near Field Communication—Interface and Protocol (NFCI P-1)", ECMA General Assembly, 3$^{rd}$ Edition, XP055119636, Jun. 11, 2013, 52 pages.
European Communication issued Jun. 10, 2015 in corresponding European Patent Application No. 15150424.8.
European Search Report issued May 22, 2015, 2015 in corresponding European Patent Application No. 15150424.8.

(56) References Cited

OTHER PUBLICATIONS

International Search Report dated Mar. 25, 2013 issued in International Application No. PCT/KR2012/010807.
Extended European Search Report dated May 17, 2013 issued in EP application No. 12196634.5.
Extended European Search Report dated May 24, 2013 issued in EP application No. 12196808.5.
Extended European Search Report dated May 24, 2013 issued in EP application No. 12196617.0.
European Office Action dated Oct. 7, 2014 in European Patent Application No. 12196617.0.
"UPnP Device Architecture 1.0", XP002521777, Document Revision Date Jul. 20, 2006, pp. 1-80.
U.S. Office Action mailed Apr. 24, 2014 in parent U.S. Appl. No. 13/712,138.
Wi-Fi Peer-to-Peer (P2P0 Technical Specification v1.2, Wi-Fi Alliance Technical Committee P2P Task Group, 2010 WiFi Alliance, 159 pages.
U.S. Notice of Allowance mailed Feb. 20, 2015 in U.S. Appl. No. 13/712,138.
U.S. Office Action dated Jul. 30, 2015 from U.S. Appl. No. 14/686,263.
U.S. Office Action dated Feb. 12, 2016 from U.S. Appl. No. 14/686,263.
U.S. Notice of Allowance dated May 18, 2016 from U.S. Appl. No. 14/686,263.
U.S. Appl. No. 13/712,138, filed Dec. 12, 2012, Sung-joon Park, Samsung Electronics Co., Ltd.
U.S. Appl. No. 14/592,483, filed Jan. 8, 2015, Chang-jung Yun, Samsung Electronics Co., Ltd.
U.S. Appl. No. 14/676,182, filed Apr. 1, 2015, Jae-in Lee, Samsung Electronics Co., Ltd.
U.S. Appl. No. 14/686,263, filed Apr. 14, 2015, Sung-joon Park, Samsung Electronics Co., Ltd.
U.S. Appl. No. 13/712,220, filed Dec. 12, 2012, Sung-joon Park, Samsung Electronics Co., Ltd.
U.S. Appl. No. 13/712,256, filed Dec. 12, 2012, Hyun-wook Park, Samsung Electronics Co., Ltd.
U.S. Appl. No. 14/471,611, filed Aug. 28, 2014, Hyun-wook Park, Samsung Electronics Co., Ltd.
U.S. Notice of Allowance dated Jan. 5, 2017 from U.S. Appl. No. 14/471,611.
Chinese Office Action dated Aug. 31, 2016 from Chinese Patent Application No. 201510013206.2, 20 pages.
Chinese Office Action dated Apr. 19, 2017 from Chinese Patent Application No. 201510013206.2. 23 pages.
U.S. Notice of Allowance dated Jul. 10, 2017 from U.S. Appl. No. 14/471,611.
Chinese Office Action dated Aug. 3, 2017 from Chinese Patent Application No. 201510154817.9, 16 pages.
Chinese Office Action dated Sep. 13, 2017 from Chinese Patent Application No. 201510013206.2, 20 pages.

\* cited by examiner

IMAGE FORMING APPARATUS SUPPORTING WI-FI DIRECT AND METHOD OF ACTIVATING WI-FI DIRECT

CROSS-REFERENCE TO RELATED APPLICATIONS

This application is a continuation of U.S. application Ser. No. 14/686,263 filed on Apr. 14, 2015, which is a continuation of U.S. application Ser. No. 13/712,138 filed on Dec. 12, 2012, which claims priority under 35 USC §120 from U.S. Provisional Patent Application No. 61/569,391, filed on Dec. 12, 2011, in the U.S. Patent and Trademark Office, the disclosures of each of which are incorporated herein in their entirety by reference.

BACKGROUND

1. Field

The present general inventive concept relates to an image forming apparatus supporting W-Fi direct, and more particularly, to an apparatus and method of activating Wi-Fi direct in an image forming apparatus supporting Wi-Fi direct.

2. Description of the Related Art

Recently, peer to peer (P2P) communication technology, by which wireless devices may be directly connected to each other without an additional wireless connecting apparatus, have been generalized and widely used. For example, Bluetooth technology makes the P2P communication possible. Although there are limitations in terms of transmission speed and transmission range of Bluetooth, new versions of Bluetooth are being developed to compensate for the limitations.

In addition, which is a wireless local area network (WLAN) standard based on IEEE 802.11 regulated by the Wi-Fi alliance, is basically a technology using ultra-high speed Internet by accessing access points (APs) connected to an infrastructure network; however, the Wi-Fi may serve the P2P communication by using an ad-hoc function. However, when the ad-hoc function is used, security is weakened, a transmission speed is lowered, and a setting method is not easily performed. Therefore, the WI-Fi alliance has suggested a WI-Fi Direct technology that makes the P2P communication possible. The Wi-Fi Direct allows P2P connection between wireless devices without using the AP, supports a transmission speed of a maximum of 250 Mbps, and performs security settings by using WI-Fi protected access 2 (WPA2), in order to address problems of the ad-hoc function. In addition, the W-Fi Direct supports a transmission range of a maximum of 200 m, and thus, is considered as a substitute for the P2P communication.

As described above, with the appearance of the Wi-Fi Direct, it is considered that utilization of the P2P communication is increased more. In addition, the P2P communication technology may be also applied to image forming apparatuses such as printers, scanners, facsimiles, and multi-function printers. Therefore, technologies for safely and conveniently using an image forming apparatus supporting the P2P connection are necessary.

SUMMARY

The present general inventive concept provides an apparatus and method of activating W-Fi Direct in an image forming apparatus supporting the W-Fi Direct.

Additional features and utilities of the present general inventive concept will be set forth in part in the description which follows and, in part, will be apparent from the description, or may be learned by practice of the general inventive concept.

The foregoing and/or other features and utilities of the present general inventive concept may be achieved by providing a multi-function printer (MFP) supporting Wi-Fi Direct, the MFP including a print engine to perform a print operation, a first wireless interface to connect the MFP to an access point (AP) of an infrastructured network, a second wireless interface to Wi-Fi Direct connect the MFP to an external wireless terminal, a soft AP to allow the MFP to perform as an AP when the MFP is W-Fi Direct connected, a dynamic host configuration protocol (DHCP) server unit to allocate an internet protocol (IP) address to the wireless device that is W-Fi Direct connected to the MFP, a Wi-Fi Direct connection manager to manage the W-Fi Direct connection, and an automatic group owner (AGO) manager to activate W-Fi direct so as to drive the soft AP and operate the MFP as a group owner (GO) when the MFP receives a W-Fi Direct activation request.

The foregoing and/or other features and utilities of the present general inventive concept may be achieved by providing a method of activating W-Fi Direct in a multi-function printer (MFP) supporting W-Fi Direct, the method including receiving a W-Fi Direct activation request by the MFP, and driving a soft access point (AP) of the MFP in order to activate Wi-Fi Direct so that the MFP may function as a group owner (GO).

The foregoing and/or other features and utilities of the present general inventive concept may be achieved by providing a multi-function printer (MFP) supporting Wi-Fi Direct, the MFP including an interface configured to receive a W-Fi Direct activation request, and a memory processor unit configured to drive a soft access point (AP) to activate W-Fi Direct such that the MFP functions as a group owner (GO) according to the received W-Fi Direct activation request.

The MFP may include a print engine to perform a print operation, the interface may perform wireless communication with an external device using W-Fi Direct, and the processor unit may control the print engine to perform the printing operation according to data received through the wireless communication using the Wi-Fi-Direct.

The interface may perform a first wireless communication with an external wireless device according to the W-Fi Direct and performs a second wireless communication with an access point of an infrastructured network, and the processor unit may be configured to set a channel for the first wireless communication and the second wireless communication and is configured to control the print engine to perform the print operation according to data received through any one of the first wireless communication or the second wireless communication using the W-Fi Direct.

The processor unit may check a channel which has been previously used in any one of the first wireless communication and the second wireless communication and set the channel for either one of the first wireless communication and the second wireless communication.

The processor may separate a security domain between the infrastructured network connection and the W-Fi Direct connection.

The processor unit may allocate an internet protocol (IP) address to the wireless device that is Wi-Fi Direct connected to the MFP.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION

Figure 1:
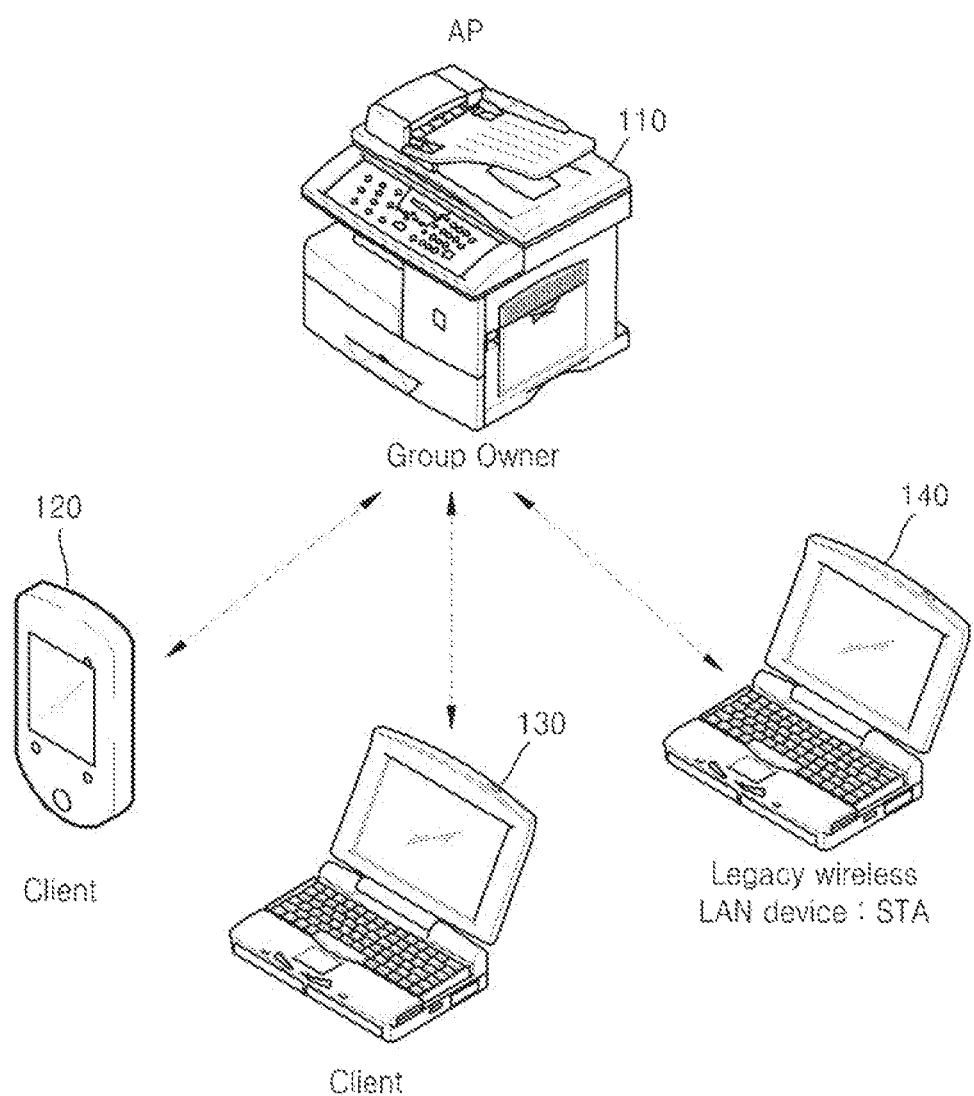
FIG. 1 is a diagram illustrating devices supporting W-Fi Direct and legacy wireless local area network (WLAN) devices that are wirelessly connected to each other to form a wireless network according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Expressions such as "at least one of" when preceding a list of elements, modify the entire list of elements and do not modify the individual elements of the list.

Hereinafter, a multi-function printer (MFP) that supports W-Fi Direct will be described as an example of an image forming apparatus supporting a peer-to-peer (P2P) connection. However, the scope of the present general inventive concept to be protected is not limited thereto, but is defined by descriptions of claims.

Before describing embodiments of the present general inventive concept, a basic connections and operations of an MFP that supports the Wi-Fi Direct will be described with reference to accompanying drawings.

FIG. 1 is a diagram illustrating wireless local area network (WLAN) devices supporting W-Fi Direct and a legacy WLAN device connecting to each other to form a wireless network according to an embodiment of the present general inventive concept. Referring to FIG. 1, an MFP 110 supporting the Wi-Fi Direct is wirelessly connected to a smartphone 120 supporting the Wi-Fi Direct, a laptop computer 130 supporting the W-Fi Direct, and a legacy WLAN laptop computer 140. Here, the legacy WLAN laptop computer 140 denotes a conventional laptop computer which adopts a WLAN technology and does not support the Wi-Fi Direct.

The WLAN device supporting the W-Fi Direct (hereinafter, referred to as "W-Fi Direct device") may perform a P2P connection without using an infrastructured network, unlike conventional devices supporting W-Fi. According to the conventional Wi-Fi technology, a W-Fi device is wirelessly connected to a router, that is, an access point (AP) connected to an infrastructured network that is configured in advance in order to form a wireless network. Here, the Wi-Fi devices, which are wirelessly connected to the AP of the infrastructure network, function as stations. However, according to W-Fi Direct technology, one of the Wi-Fi Direct devices that are to form a wireless network may operate as an AP of a W-Fi Direct network, and the other W-Fi Direct devices are wirelessly connected to the Wi-Fi Direct device that operates as the AP such that the other Wi-Fi Direct devices operate as stations. Therefore, the wireless network may be formed between the Wi-Fi direct devices without the AP connected to the infrastructured network. In addition, when the wireless network is formed between the W-Fi direct devices, the legacy WLAN devices, such as the W-Fi devices, may recognize that the WI-Fi direct device operates as an AP and may be wirelessly connected to the W-Fi direct device.

Referring to FIG. 1, the Wi-Fi Direct MFP 110, the W-Fi Direct smartphone 120, and the Wi-Fi Direct laptop computer 130 that are the W-Fi direct devices form a wireless network without an AP connected to the infrastructured network. As described above, the W-Fi direct devices may be wirelessly connected to each other to form a P2P group without an AP connected to the infrastructured network. Here, the W-Fi Direct MFP 110 operates as the AP, and the device operating as the AP among the W-Fi direct devices is referred to as a group owner (GO) of a P2P group. In addition, the W-Fi smartphone 120 and the W-Fi Direct laptop computer 130 are wirelessly connected to the GO, that is, the W-Fi Direct MFP 110, to operate as the stations, which are referred to as clients. On the other hand, the legacy WLAN laptop computer 140 that does not support the Wi-Fi Direct recognizes that the GO, that is, the W-Fi Direct MFP 110, as the AP, and is wirelessly connected to the GO to be connected to the wireless network formed by the Wi-Fi direct devices.

Although FIG. 1 illustrates the W-Fi Direct MFP 110 to operate as the GO, any one of the other W-Fi direct devices, that is, the smartphone 120 and the laptop computer 130, may operate as the GO and the MFP 110 may operate as the client. A determination of which of the W-Fi direct devices becomes the GO can be made through a negotiation process in W-Fi direct connection processes, and this will be described in detail later. Meanwhile, the W-Fi direct device may be the GO by itself before the connection without any negotiation with other W-Fi Direct device, and the W-Fi direct device in this case is referred to as an autonomous group owner (AGO). In addition, a wireless network formed based on the AGO is referred to as an autonomous P2P group. When the autonomous P2P group is formed, the legacy WLAN device may recognize the AGO as an AP connected to the infrastructured network and may be connected to the AGO.

Although FIG. 1 illustrates an example in which the Wi-Fi direct devices form the P2P group without the AP connected to the infrastructured network, the W-Fi direct devices may operate as the stations by connecting to the AP, if the AP is connected to the infrastructured network.

Hereinafter, wireless connecting processes between the W-Fi direct devices and characteristics of the W-Fi Direct technology will be described with reference to the accompanying drawings. For convenience of description, an MFP supporting the W-Fi Direct (hereinafter, referred to as "W-Fi Direct MFP") will be described as an example; however, the present general inventive concept is not limited thereto, that is, embodiments of the present general inventive concept may be applied to printers, scanners, or facsimiles supporting the WI-Fi Direct. In addition, the W-Fi Direct is used as an example of the P2P communication method; however, other P2P communication methods, such as Bluetooth and Zigbee, may be used within the applicable range of the present general inventive concept.

Figure 2:
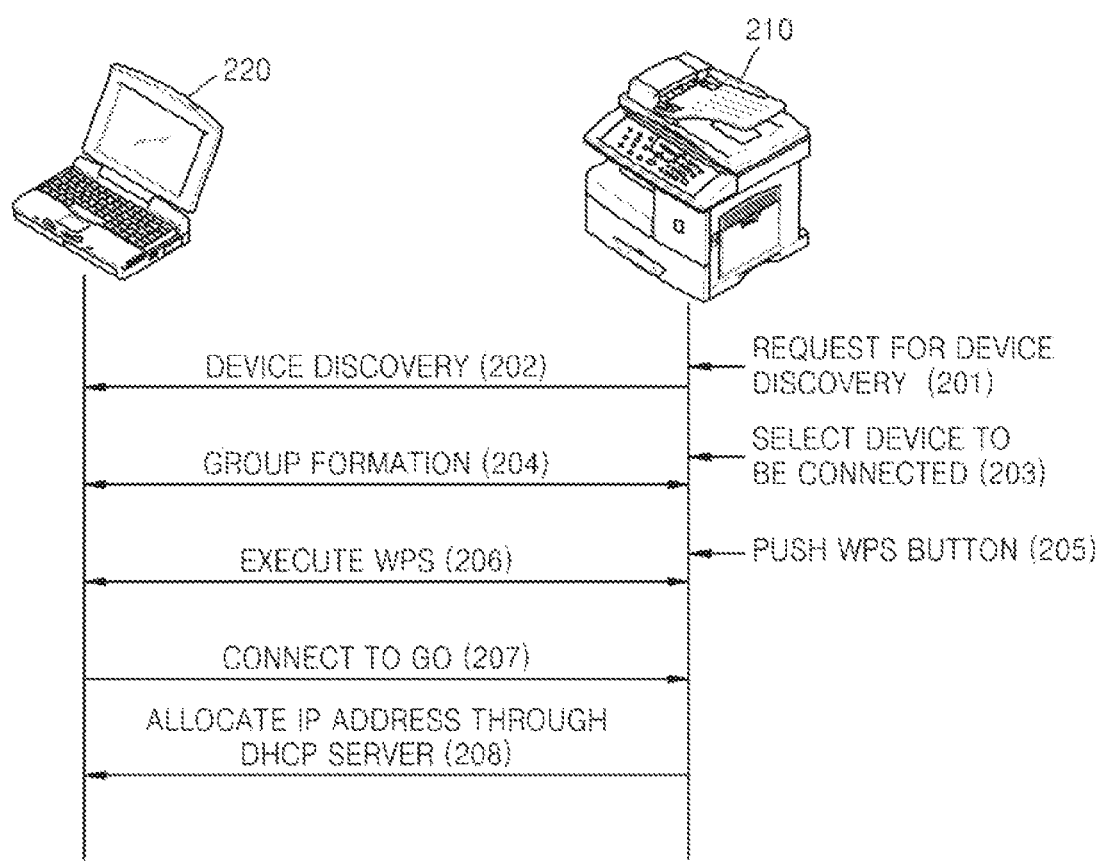
FIG. 2 is a diagram illustrating processes of wirelessly connecting the devices supporting the Wi-Fi Direct to each other according to an embodiment of the present general inventive concept.

FIG. 2 is a diagram illustrating processes of wirelessly connecting W-Fi Direct devices to each other. The processes of W-Fi Direct connection between a W-Fi Direct MFP 210 and a W-Fi Direct laptop computer 220 are illustrated hereinafter. The W-Fi Direct connecting processes may be divided as a device discovery process, a group formation process, and a secure connection process. Referring to FIG. 2, the W-Fi Direct MFP 210 receives a request for a device discovery from a user, and searches for a Wi-Fi Direct device around the Wi-Fi Direct MFP 210 at operation 202.

The device discovery request may be input through a user interface of the MFP 210, for example, a user interface realized on a display unit, such as a liquid crystal display (LCD), formed in the MFP 210. If it is determined as a result of searching that there is a Wi-Fi Direct device around the MFP 210, the MFP 210 shows the user the searched device through the display unit and receives a connection request 203 from the user. The connection request 203 may be also input through the display unit of the MFP 210 from the user, for example, the user may push buttons or a touch panel of the display unit. If there is a plurality of Wi-Fi Direct devices, the MFP 210 displays a list of the searched W-Fi direct devices on the display unit so that the user may select one of the W-Fi direct devices and request the connection to the selected W-Fi direct device.

After receiving the connection request at operation 203, a group formation is performed between the W-Fi Direct devices to be connected at operation 204. The group formation process determines the W-Fi Direct devices to be connected to each other and determines the W-Fi direct devices to be the GO or the clients in the group. The W-Fi Direct device to be the GO is determined through the negotiation between the W-Fi Direct devices, and the negotiation will be described in detail with reference to FIG. 4.

When the group is formed, the devices included in the group are to be securely connected to each other by using a W-Fi protected setup (WPS) technology. The WPS denotes a function of performing simple secure connection between the Wi-Fi supporting devices. The WPS may be classified as a personal identification number (PIN) type WPS and a push button configuration (PBC) type WPS. The PIN type WPS sets the secure connection by inputting a PIN code that is set in advance, and the PBC type WPS sets the secure connection by pushing a WPS button that is provided on the W-Fi Direct device.

Hereinafter, the PBC type WPS will be described as an example. The user pushes a WPS button provided on the MFP 210 to request the secure connection at operation 205. In addition, within a predetermined period of time (for example, 120 seconds), the secure connection may be achieved by pushing a WPS button formed on the laptop computer 220, or a WPS button realized on an application program for W-Fi Direct connection in the laptop computer 220. The WPS button realized on the application program for the W-Fi Direct connection in the laptop computer 220 may be an object represented on a display unit of the laptop computer 220 by the application program for the W-Fi Direct connection. A detailed example of the WPS button is represented as reference numeral 510 in FIG. 5. The user clicks the WPS button represented on the display unit of the laptop computer 220 by using a mouse, for example, to request the secure connection. When the secure connection is requested by pushing the WPS button, the device that is determined to be the GO in the group formation process transmits secure information to devices determined as the clients at operation 206. According to the W-Fi Direct, the secure connection is executed after encrypting in a W-Fi protected access 2 (WPA2)-pre-shared key (PSK) method, and thus, the W-Fi Direct may have a higher security function than that of a conventional wired equivalent privacy (WEP) or W-Fi protected access (WAP) method.

When the WPS is executed, the W-Fi direct device that is the client is connected to the Wi-Fi direct device that is the GO at operation 207. At this time, the W-Fi Direct device that is the GO automatically allocates an Internet protocol (IP) address to the Wi-Fi direct device that is the client by using a dynamic host configuration protocol (DHCP) server at operation 208, and then, the P2P connection between the Wi-Fi Direct devices is completed.

Basic processes for connecting the W-Fi direct devices have been described so far, and detailed processes and characteristics of the W-Fi Direct technology will be described with reference to the accompanying drawings as follows.

Figure 3:
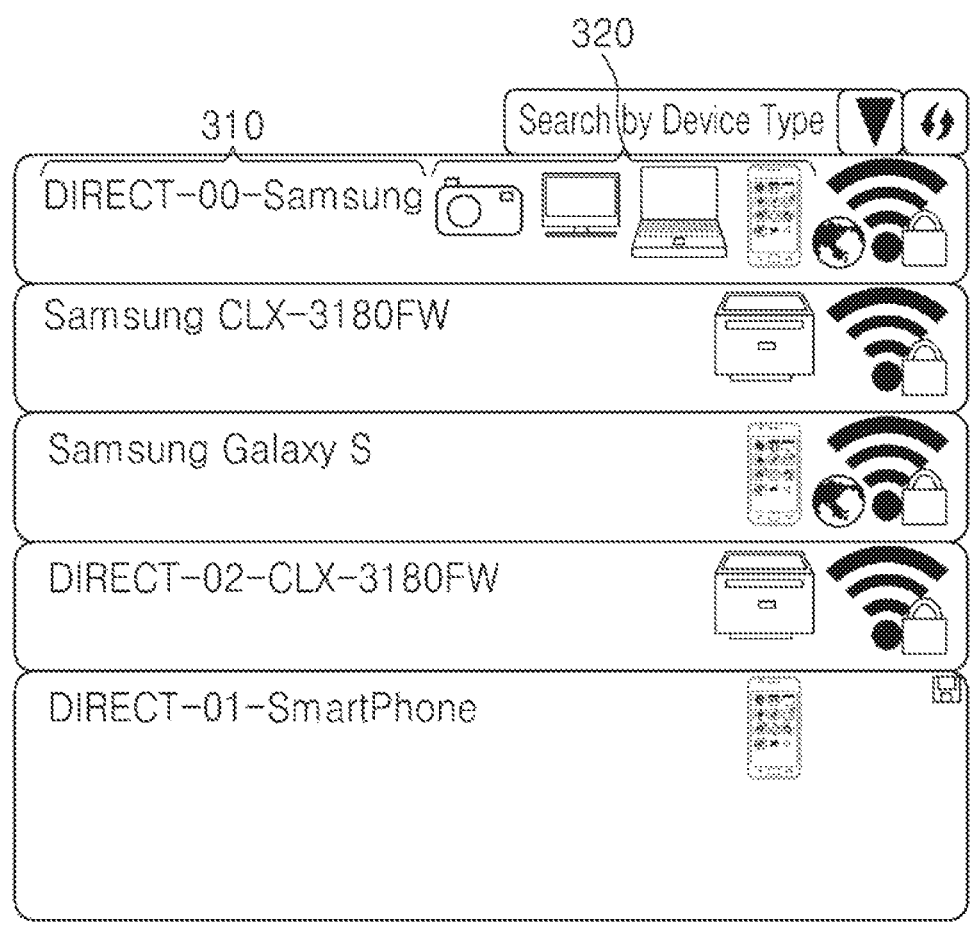
FIG. 3 is a diagram illustrating an example of displaying a list of W-Fi Direct devices that are found after a device discovery process performed by a device supporting the Wi-Fi Direct.

FIG. 3 is a diagram illustrating an example of displaying a list of the Wi-Fi Direct devices that are searched in the device discovery process in the W-Fi Direct device. When the device discovery process is performed by the W-Fi direct device, device information, such as a type of the device and a service set identifier (SSID) of the device, is exchanged between the devices through a probe request and a probe response that are WLAN packets, and the W-Fi direct device that performs the device discovery process displays the collected information. As shown in FIG. 3, the SSIDs and the types of the searched W-Fi Direct devices are represented as text or icons. Here, all of the searched devices may be represented in the list; however, the devices may be filtered so that the devices of a desired type may be only displayed in the list. According to the W-Fi Direct technology, the W-Fi direct devices are defined in category units. The W-Fi Direct devices may be classified as categories, for example, computers, input devices, printers, scanners, facsimiles, copying machines, and cameras, and each of the categories is divided into sub-categories. For example, the computer may be classified as personal computers (PCs), servers, laptop computers, and the like.

Figure 4:
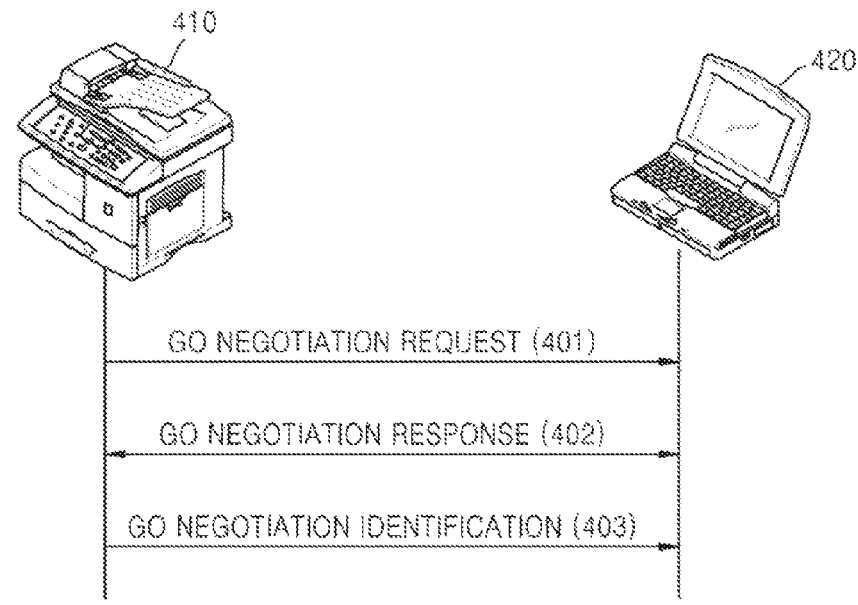
FIG. 4 is a diagram illustrating a group formation process in the processes of connecting the Wi-Fi Direct supporting devices to each other according to an embodiment of the present general inventive concept.

FIG. 4 is a diagram illustrating the group formation process in detail among the connecting processes between the Wi-Fi Direct devices. The group formation process is a process of determining the W-Fi Direct devices that are to form a network, and the W-Fi Direct devices to be the GO and the clients. For example, when the W-Fi direct MFP 410 performs the device discovery and selects a laptop computer 420 among the discovered W-Fi Direct devices to be connected, the MFP 410 transmits a GO negotiation request to the laptop computer 420 at operation 401. The laptop computer 420 receiving the GO negotiation request compares an intent value thereof with that of the MFP 410, and then, determines the MFP 410 as the GO when the intent value of the MFP 410 is greater than that of the laptop computer 420 and determines the laptop computer 420 as the GO when the intent value of the laptop computer 420 is greater than that of the W-Fi direct MFP 410. Here, the intent value is a value representing a degree of task intent in each device, and is determined according to a design or user preference and setting. The intent value of the device, which is always supplied power, may be set to be relatively high. As described above, after determining the W-Fi Direct device to be the GO by comparing the intent values, the laptop computer 420 transmits the determination result to the MFP 410 as a response to the GO negotiation at operation 402. The MFP 410 that receives the determination result transmits an acknowledgement to the laptop computer 420 at operation 403 in order to verify the receipt of the negotiation, and then, the group formation process is finished. When the group formation is completed, the W-Fi Direct device that is the GO manages secure information and SSIDs of the other W-Fi Direct devices included in the group.

Figure 5:
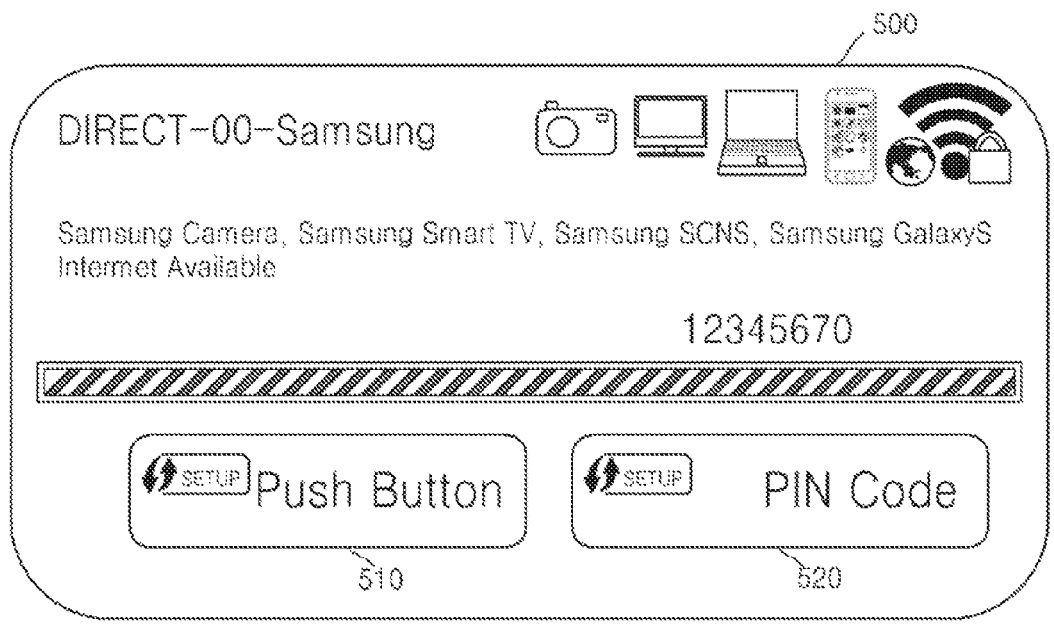
FIG. 5 is a diagram illustrating a display screen to execute WPS according to an embodiment of the present general inventive concept.

When the group is formed, the Wi-Fi Direct devices included in the group are securely connected to each other through the WPS. FIG. 5 is a diagram illustrating a display screen 500 to provide an interface to a user to execute the WPS. The display screen 500 of FIG. 5 may be displayed on a display unit of the W-Fi Direct MFP. Referring to FIG. 5, the user may select one of a WPS button 510 and a PIN code 520 to execute the WPS. When the WPS is executed through the WPS button 510, the WPS button 510 of the W-Fi Direct MFP is pushed and WPS buttons of other devices are pushed within a predetermined period of time, and then, secure information is exchanged between the devices automatically and the secure connection is made. Here, the Wi-Fi Direct device that is the GO provides secure information to the W-Fi direct devices that are the clients. In addition, the secure connection is performed after encrypting in the WPA2-PSK verification method, and thus, high security may be achieved.

Figure 6:
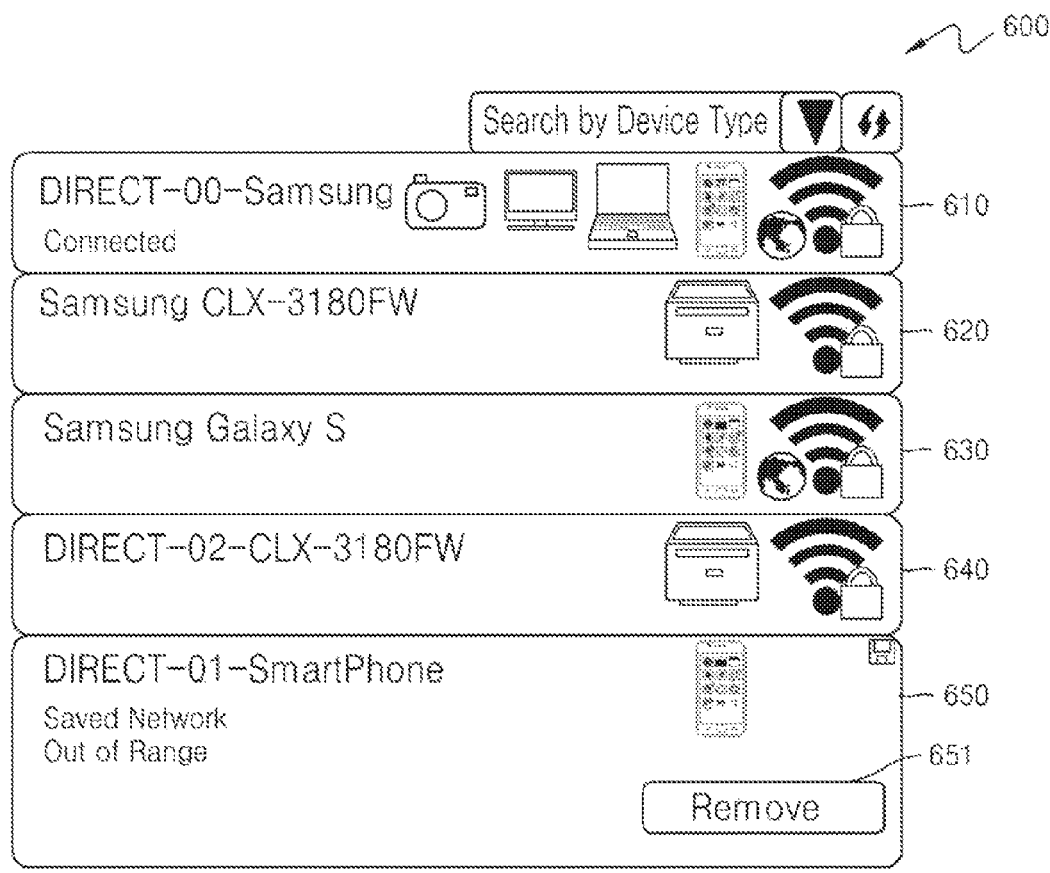
FIG. 6 is a diagram illustrating a list of devices supporting W-Fi Direct and information of which is stored according to a profile storing function.

The W-Fi Direct devices have a profile storage function that is for storing information of the Wi-Fi Direct devices connected once thereto. FIG. 6 is a diagram illustrating a list of the W-Fi Direct devices with information of which is stored according to the profile storage function. The list of FIG. 6 is a screen displayed on the display unit of the W-Fi Direct MFP. Information of a first list 610 denotes a W-Fi Direct device currently connected to the Wi-Fi Direct MFP, information of second through fourth lists 620-640 denotes W-Fi Direct devices that are not currently connected to the W-Fi Direct MFP, but are included in a device discovery range of the W-Fi Direct MFP, and information of a fifth list 650 denotes a W-Fi Direct device that has been connected at least once to the W-Fi Direct device although that is not discovered currently. If the information of the fifth list 650 is not necessary, the user may delete the fifth list 650 by pushing a remove button 651. Since the W-Fi direct device has the profile storage function as described above, the W-Fi Direct device stores information of the other W-Fi Direct devices connected at least once thereto, and then, may be connected in a high speed and/or in a short period of time without executing the WPS by using the stored information in a case where the same device attempts to connect thereto again.

Figure 7:
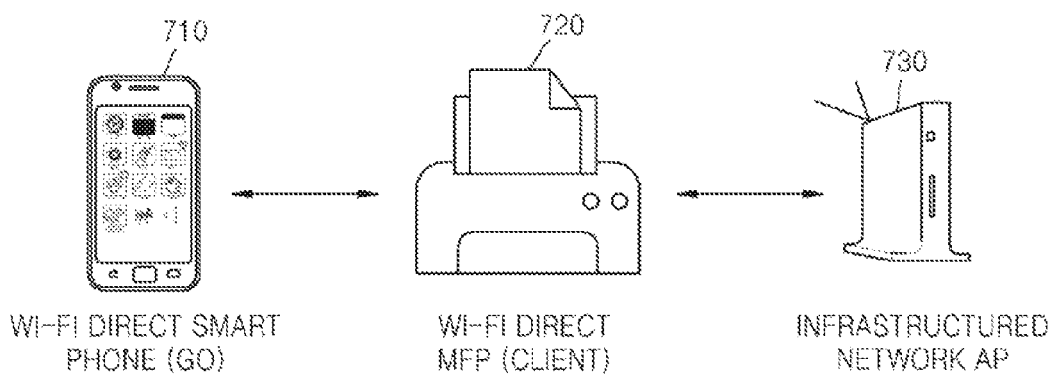
FIG. 7 is a diagram illustrating W-Fi Direct supporting devices that are simultaneously connected to each other according to an embodiment of the present general inventive concept.

The W-Fi Direct device may be P2P connected to another W-Fi direct device, and at the same time, may be connected to the infrastructured network, which is referred to as a concurrent connection. FIG. 7 is a diagram illustrating the W-Fi Direct devices that are in the concurrent connection states. Referring to FIG. 7, the W-Fi direct MFP 720 is P2P connected to a smartphone 710 that is another Wi-Fi direct device, and at the same time, the W-Fi Direct MFP 720 is also connected to an AP 730 of the infrastructured network. The W-Fi Direct MFP 720 may directly transmit/receive print data to/from the smartphone 710, and at the same time, may directly transmit/receive print data to/from the infrastructured network through the AP 730 of the infrastructured network.

When the W-Fi direct device is concurrently connected to the W-Fi Direct device and the infrastructured network as shown in FIG. 7, or when the W-Fi Direct device is wired connected to the infrastructured network and P2P connected to another W-Fi direct device, different IP addresses and MAC addresses with respect to the connections, that is, the connection to the infrastructured network and the connection to the another Wi-Fi Direct device, may be used. Through a multi-homing technology, the W-Fi Direct device may provide the devices with different services from each other. For example, the Wi-Fi Direct MFP may provide services of all functions of the MFP through an interface connected to the infrastructured network; however, the W-Fi Direct MFP may provide services of partial functions of the MFP through an interface connected to another Wi-Fi Direct device.

Figure 8:
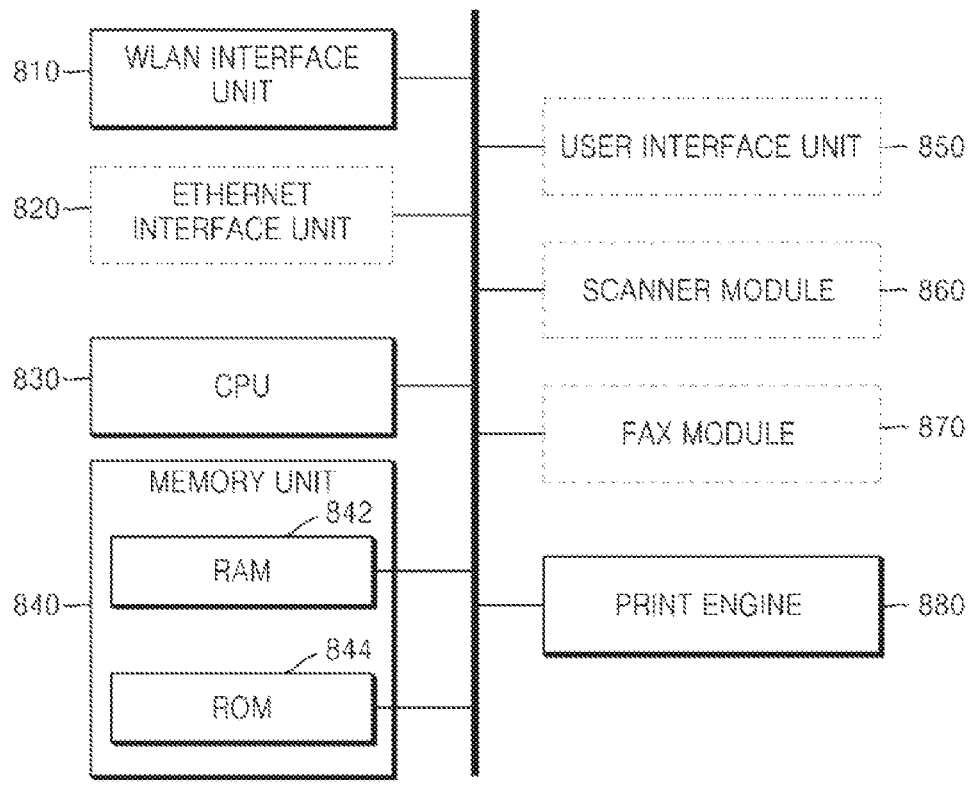
FIG. 8 is a block diagram illustrating a hardware configuration of a multi-function printer supporting the W-Fi Direct according to an embodiment of the present general inventive concept.

FIG. 8 is a block diagram illustrating a hardware configuration of the W-Fi Direct MFP. Referring to FIG. 8, the Wi-Fi Direct MFP may include a WLAN interface module 810, an Ethernet interface module 820, a central processing unit or a processing unit (CPU) 830, a memory unit 840, a user interface module 850, a scanner module 860, a fax module 870, and a print engine 880. The memory unit 840 may include a random access memory (RAM) 842 and a read only memory (ROM) 844. The memory unit 840 may include one or more semiconductor chips or one or more semiconductor chip packages in which a plurality of semiconductor chips are mounted on a substrate thereof. If the MFP only supports the WLAN, the MFP may not include the Ethernet interface module 820. In addition, if the device is a printer, rather than the MFP, the scanner module 860 and the fax module 870 are not necessary.

The WLAN interface module 810 is hardware to perform an IEEE 802.11 b/g/n function, and may communicate with a main board, on which the CPU 830 is mounted, of the MFP via a universal serial bus (USB). The Ethernet interface module 820 is hardware to perform wired Ethernet communication according to IEEE 802.3. The CPU 830 controls overall operations of the MFP. The memory unit 840 stores information to control the MFP and the print data to be read if necessary. The user interface module 850 functions as a medium for the user to identify information of the MFP and to input commands into the MFP. The user interface module 850 may be variously modified according to products, for example, may be configured as two or four lines displayed on a display unit, such as an LCD or a light emitting diode (LED), or may be realized as a graphic user interface (UI) so as to represent various graphics. The scanner module 860, the fax module 870, and the print engine 880 are hardware to perform functions of a scanner, a facsimile, and a printer. The print engine 880 may include electrical and mechanical components to print an image on a print medium according to the data stored in the memory unit 840 or received from an external wireless device through the WLAN and/or WI-Fi-Direct.

Figure 9:
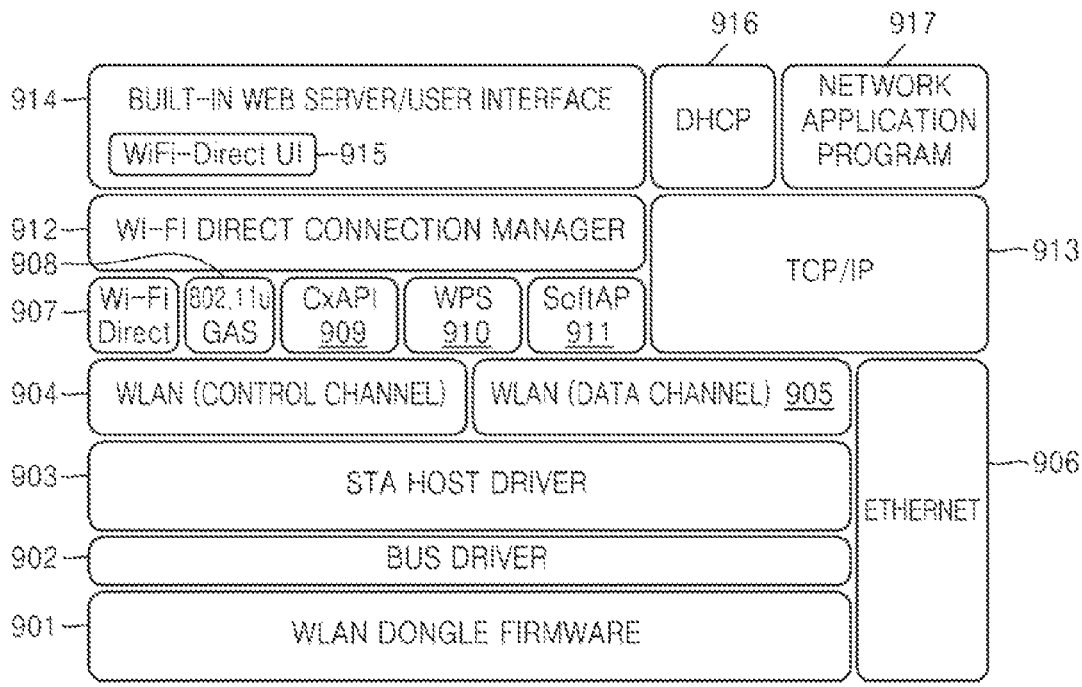
FIG. 9 is a block diagram illustrating a software program configuration of the multi-function printer supporting the W-Fi Direct of FIG. 8 according to an embodiment of the present general inventive concept.

FIG. 9 is a block diagram illustrating a software program configuration of the Wi-Fi Direct MFP. The configuration of the software program in the Wi-Fi Direct MFP will be described with reference to FIG. 9 as follows.

A WLAN dongle firmware 901 is firmware to connect the WLAN, and may be stored in WLAN dongle hardware or may be transmitted to the WLAN dongle hardware from a main board of the MFP when booting the MFP. A bus driver 902 and a STA (station) host driver 903 are low level bus drivers to communicate with the WLAN hardware. A WLAN controlling channel 904 and a WLAN data channel 905 are channels to communicate with the WLAN firmware. A Wi-Fi Direct module 907 performs the Wi-Fi Direct connection and transmits an operating command to the WLAN firmware. An IEEE 802.11u generic advertisement service (GAS) module 908 performs functions according to IEEE 802.11u GAS, a module 909 performs functions relating to CxAPI, and a WPS module 910 performs a WPS function. A soft AP module 911 is a software program module to allow the MFP to perform as the AP. A transmission control protocol (TCP)/IP 913 is a standard protocol for network transmission. A Wi-Fi Direct connection manager 912 is a module to control the Wi-Fi Direct connection. A Wi-Fi Direct user interface 915 allows the user to perform settings related to the Wi-Fi Direct, and may be included in a user interface 914 that is installed in an embedded web server (EWS). A DHCP server 916 automatically allocates an IP address to the Wi-Fi Direct device that is connected as a client. A network application program 917 performs various application operations relating to the network.

The above-described W-Fi Direct technology provides the W-Fi Direct device and/or the devices of the wireless network with the following advantages:

A W-Fi Direct device may be connected to other devices whenever and wherever, and thus, the Wi-Fi Direct device has maximum mobility and portability. If a new W-Fi Direct device is added, the W-Fi Direct device may be directly connected to the new W-Fi direct device. In addition, it may be identified whether there is an available device or service before setting the connection to other devices, and thus, the W-Fi direct devices may be conveniently used. In addition, the connection may be performed simply and stably by a simple operation, for example, pushing a WPS button, and the connection may be performed with highly secure functions by using WPA2 technology.

In addition, the W-Fi Direct technology may provide various functions in addition to functions provided by the conventional WLAN technology.

For example, the device discovery function to search for peripheral Wi-Fi Direct devices by a device type unit, the service discovery function that may search for services provided by the peripheral Wi-Fi Direct devices, a power management function that may effectively use electric power, the concurrent connection function that may form the P2P connection between the W-Fi Direct devices while connecting to a conventional infrastructured network, a function of separating a security domain between the infrastructured network connection and the W-Fi Direct connection, and a cross connection function to share an Internet connection may be provided by the W-Fi Direct technology.

In addition, since the W-Fi Direct technology is based on the conventional WLAN technology, that is, IEEE 802.11, the W-Fi Direct devices may be compatible with conventional legacy WLAN devices.

Hereinafter, a method of activating W-Fi Direct, a method of performing image forming operations, a method of managing channels, and a method of changing a WLAN mode in an MFP supporting W-Fi Direct will be described in detail with reference to the accompanying drawings.

As illustrated in the description with reference to FIG. 7, the MFP supporting W-Fi Direct supports the concurrent connection function, that is, may be connected to the infrastructured network and P2P connected to a wireless terminal supporting W-Fi Direct. The concurrent connection function is very useful in a situation where the MFP is connected to an AP of the infrastructured network and at the same time, a print operation has to be performed by using wireless devices that are not connected to the AP. The wireless devices that are not connected to the AP may be connected to the MFP by using an ad-hoc function in order to use a wireless printing service; however, if one MFP is connected to the infrastructured network, the MFP may not simultaneously use the ad-hoc function.

Detailed operation methods of performing image forming operations, such as a printing or scanning operation, by using the wireless devices that are P2P connected to the MFP via Wi-Fi Direct when the MFP uses the concurrent connection function, managing channels used to connect to the infrastructured network and to connect the Wi-Fi Direct, and changing an operation mode between the W-Fi Direct mode and the ad-hoc operation mode are to be provided.

First, a method of activating W-Fi Direct so that the MFP supporting W-Fi Direct functions as an AGO will be described below.

Figure 10:
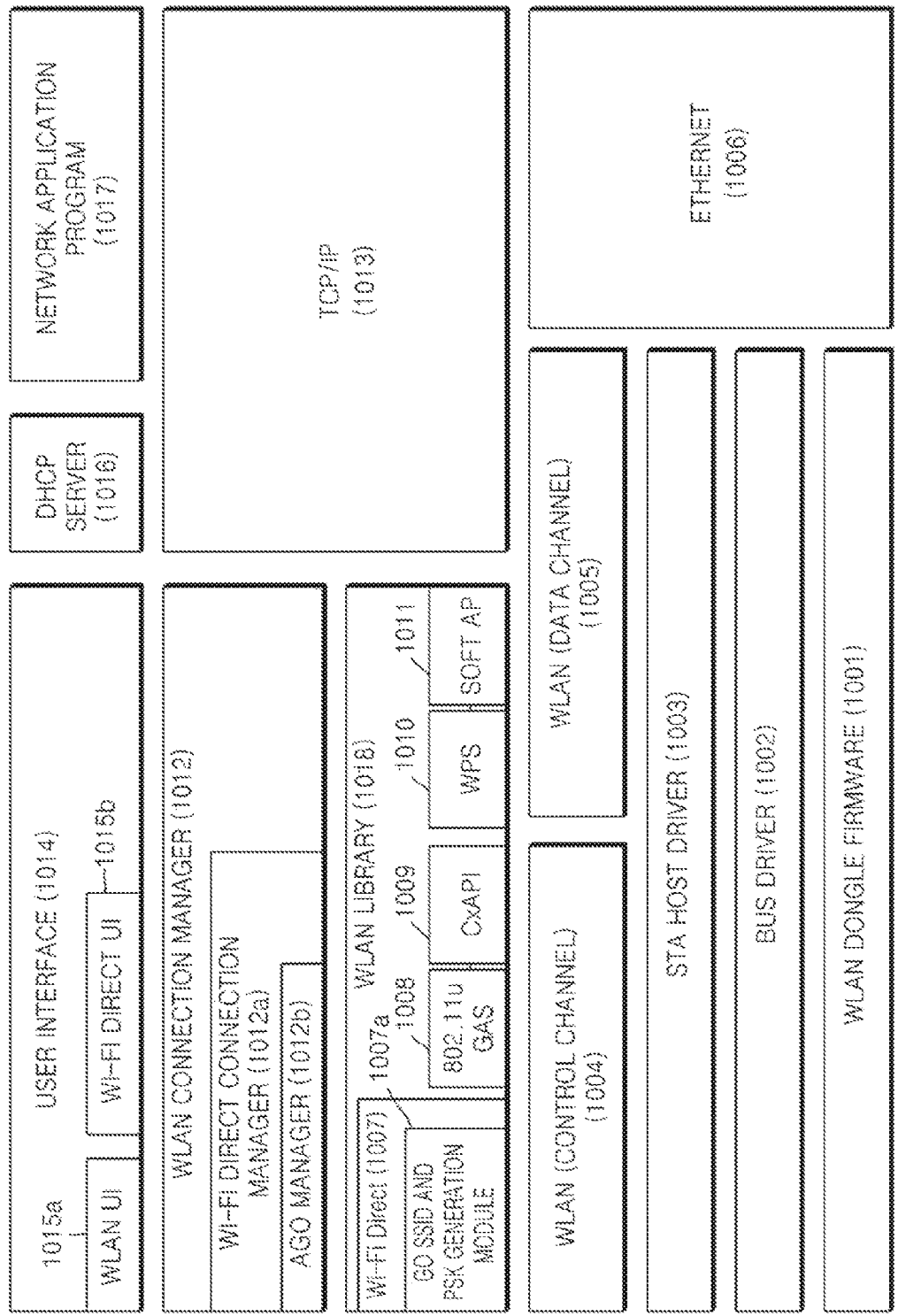
FIG. 10 is a detailed block diagram illustrating a software program configuration of a multi-function printer supporting the W-Fi Direct according to an embodiment of the present general inventive concept.

FIG. 10 is a block diagram illustrating a software program configuration of an MFP supporting W-Fi Direct according to an embodiment of the present invention. FIG. 10 illustrates an AGO 1012b included in a W-Fi Direct connection manager 1012a to make the MFP supporting Wi-Fi Direct perform as an AGO. Also, a GO SSID and PSK generation module 1007a included in a W-Fi Direct library 1007 generates an SSID and a PSK that are necessary when the MFP functions as the AGO.

FIG. 10 also illustrates similar features to those of FIG. 9. For example, a WLAN dongle firmware 1001 is firmware for connecting the WLAN, and may be stored in WLAN dongle hardware or may be transmitted to the WLAN dongle hardware from a main board of the MFP when booting the MFP. A bus driver 9102 and a STA (station) host driver 1003 are low level bus drivers for communicating with the WLAN hardware. A WLAN controlling channel 1004 and a WLAN data channel 1005 are channels for communicating with the WLAN firmware. A W-Fi Direct module 1007 performs the W-Fi Direct connection and transmits an operating command to the WLAN firmware. An IEEE 802.11u generic advertisement service (GAS) module 1008 performs functions according to IEEE 802.11u GAS, a module 1009 performs functions relating to CxAPI, and a WPS module 1010 performs a WPS function. A soft AP module 1011 is a software module allowing the MFP to perform as the AP. A transmission control protocol (TCP)/IP 1013 is a standard protocol for network transmission. A W-Fi Direct connection manager 1012 is a module for controlling the W-Fi Direct connection. A W-Fi Direct user interface 1015 allows the user to perform settings related to the Wi-Fi Direct, and may be included in a user interface 1014 that is installed in an embedded web server (EWS). A DHCP server 1016 automatically allocates an IP to the W-Fi Direct device that is connected as a client. A network application program 1017 performs various application operations relating to the network.

Figure 11:
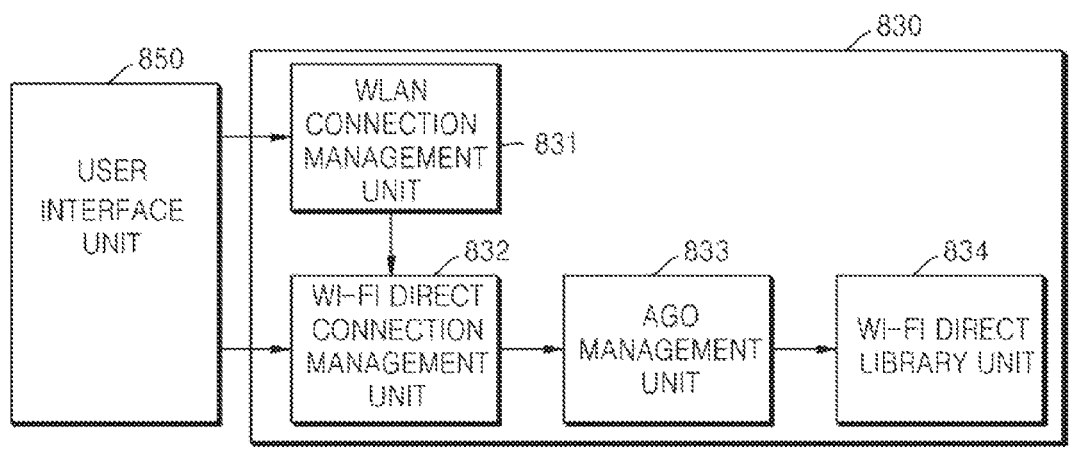
FIG. 11 is a detailed block diagram illustrating the multi-function printer supporting the W-Fi direct according to the embodiment of the present general inventive concept.

FIG. 11 is a detailed block diagram illustrating an MFP supporting W-Fi Direct according to the embodiment of the present general inventive concept. FIG. 11 illustrates a basic structure of the MFP supporting Wi-Fi Direct. The CPU 830 of FIG. 8 includes a WLAN connection manager 831, a W-Fi Direct connection manager 832, an AGO manager 833, and a W-Fi Direct library unit 834. The W-Fi Direct connection manager 832 receives a W-Fi Direct initialization command from the WLAN connection manager 831 from a user via the user interface module 850, and then, the Wi-Fi Direct connection manager 832 turns a GO flag on. The AGO manager 833 identifies the GO flag, and when the GO flag is in a turned on state, the AGO manager 833 activates Wi-Fi Direct so that the MFP performs as a GO. The W-Fi Direct library unit 834 generates an SSID and a PSK of the GO according to a command of the AGO manager 833.

Figure 12:
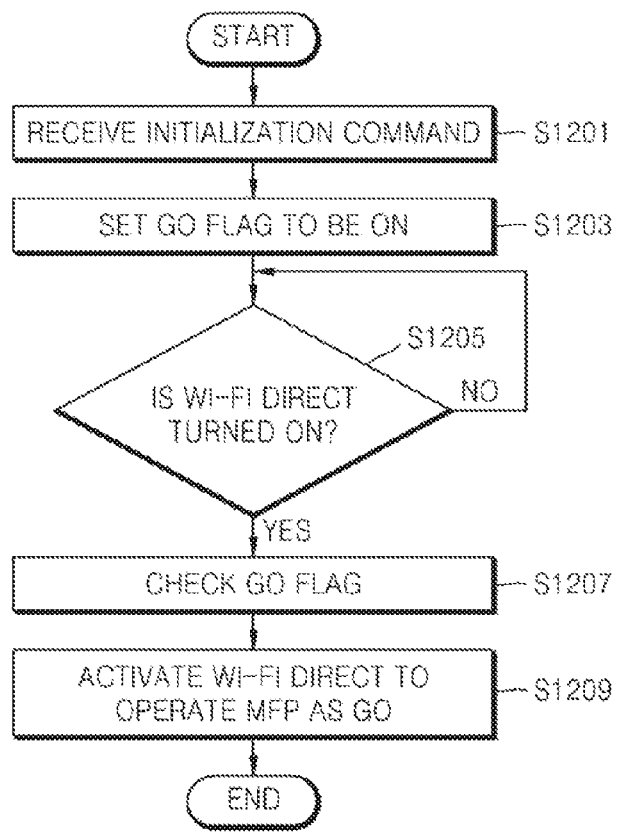
FIGS. 12, 13A, and 13B are flowcharts illustrating a method of activating Wi-Fi Direct in the multi-function printer supporting W-Fi Direct of FIG. 11 according to an embodiment of the present general inventive concept.
Figure 13A:
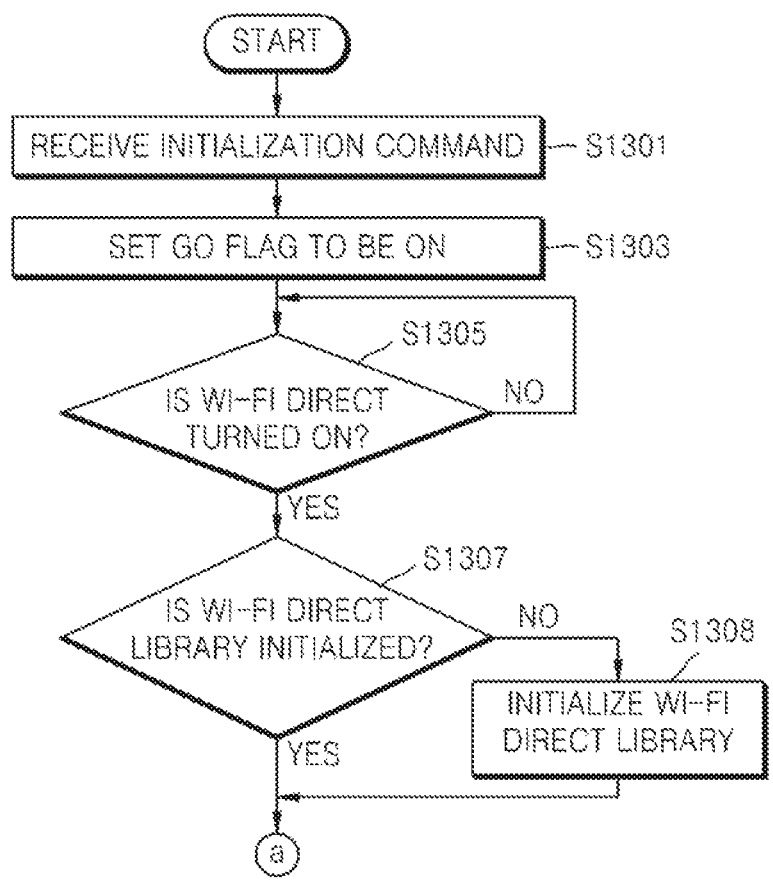
Figure 13B:
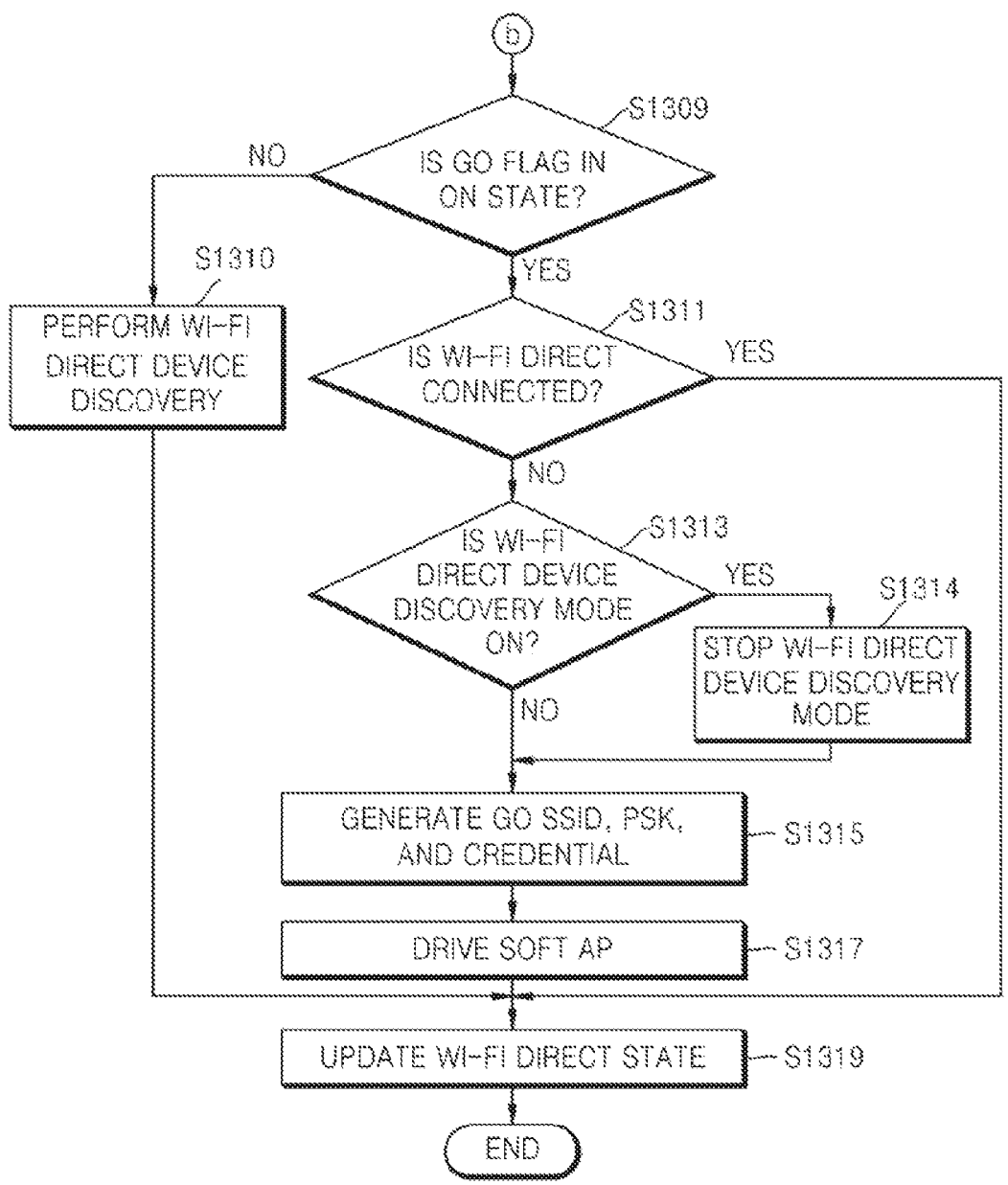

FIGS. 12, 13A, and 13B are flowcharts illustrating a method of activating W-Fi Direct in an MFP supporting W-Fi Direct, according to an embodiment of the present general inventive concept. Hereinafter, the method of activating W-Fi Direct will be described in detail with reference to FIGS. 11 through 13.

Referring to FIG. 12, an initialization command is received at operation S1201. The initialization command is a Wi-Fi Direct initialization command, and may be an MFP initialization command that is accompanied with the initialization of W-Fi Direct. The initialization command may be directly input by the user via the user interface module 850, or may be transmitted from the WLAN connection manager 831. When the initialization command is received, the W-Fi Direct connection manager 832 turns the GO flag on at operation S1203. The GO flag is an index representing whether W-Fi Direct is activated so that the MFP becomes the GO. When the GO flag is in a turned on state, the MFP functions as the GO, and when the GO flag is in a turned off state, the MFP does not function as the GO. In the present embodiment, the GO flag is automatically turned on when the initialization command is received, and thus, the MFP may perform as the AGO without connecting to the other W-Fi Direct devices. In addition, it is determined whether W-Fi Direct is turned on at operation S1205. If Wi-Fi Direct is turned on, the process goes to operation S1207 in which the AGO manager 833 identifies the GO flag. If the GO flag is in a turned on state, the process goes to operation S1209 in which W-Fi Direct is activated so that the MFP becomes the GO. However, when determining whether W-Fi Direct is in a turned on state in operation S1205, the turned on state of Wi-Fi Direct denotes that the MFP is set to use the Wi-Fi Direct function.

Referring to FIG. 13A, when an initialization command at operation S1301 is received, the GO flag is turned on at operation S1303, and it is determined whether W-Fi Direct is in a turned on state at operation S1305. The above processes are the same as the operations described with reference to FIG. 12. When it is determined that W-Fi Direct is in a turned on state in operation S1305, the W-Fi Direct connection manager 832 determines whether the Wi-Fi Direct library is initialized. If it is determined that the W-Fi Direct library is initialized, the process goes to operation S1309 of FIG. 13B in which the AGO manager 833 determines whether the GO flag is in a turned on state. Otherwise, if it is determined that the W-Fi Direct library is not initialized, the W-Fi Direct library is initialized in operation S1308, and then, the process goes to operation S1309. If the GO flag is determined to be in the turned on state in operation S1309, it is determined whether W-Fi Direct is connected at operation S1311. Otherwise, if the GO flag is in the turned off state, a W-Fi Direct device discovery process is performed at operation S1310, and then, the process goes to operation S1319 to update the state of Wi-Fi Direct. If it is determined that Wi-Fi Direct is connected in operation S1311, the W-Fi Direct state is also updated in operation S1319. Otherwise, if it is determined that W-Fi Direct is not connected in operation S1311, it is determined whether the W-Fi Direct device discovery mode is operating at operation S1313. If the device discovery mode is not operating, the process goes directly to operation S1315; however, if the device discovery mode is operating, the W-Fi Direct device discovery mode is terminated at operation S1414, and the process goes to operation S1315. An SSID, a PSK, and a GO credential that are necessary when the MFP operates as the GO are generated at operation S1315, and then, a soft AP is driven to activate W-Fi Direct so that the MFP operates as the GO at operation S1317, and the W-Fi Direct state is updated at operation S1319.

As described above, when activating Wi-Fi Direct according to the W-Fi Direct initialization command, the MFP may operates as the AGO even when the MFP is not connected to other W-Fi Direct devices, and thus, the W-Fi Direct network is formed in advance to be connected to legacy wireless devices that do not support W-Fi Direct. In addition, the MFP may perform as a GO having relatively higher power consumption due to an advantage that the MFP may consume a lot of electric power as a fixed device, that is a stationary device to receive a power to operate with the received power and also to be able to supply the power to an external device through a wired or wireless transmission method. Also, an IP address of the MFP may be fixed.

Figure 14:
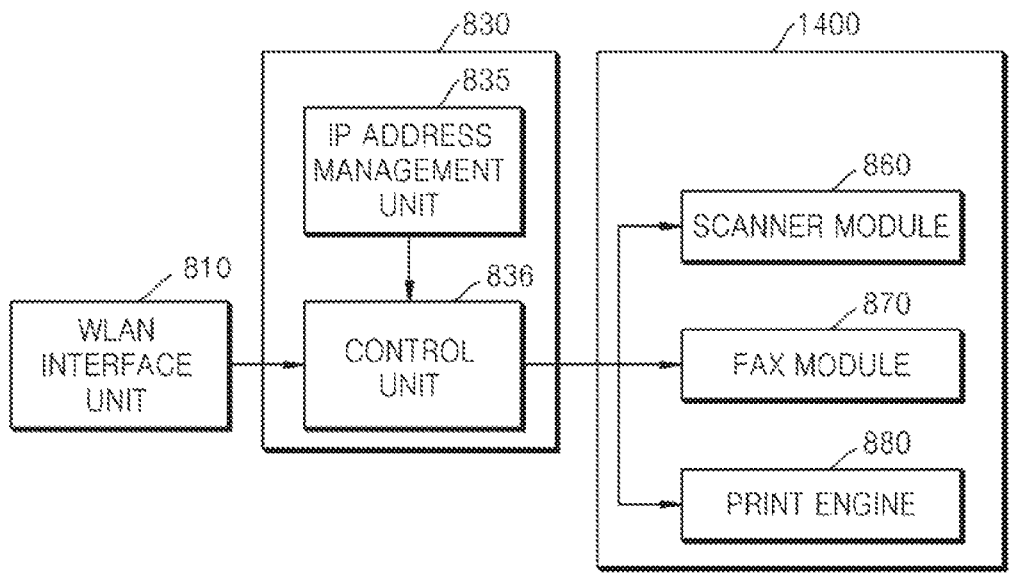
FIG. 14 is a detailed block diagram illustrating a multi-function printer supporting W-Fi Direct according to an embodiment of the present general inventive concept.

Hereinafter, a method of performing image processes in an MFP supporting W-Fi Direct will be described with reference to the accompanying drawings. FIG. 14 is a detailed block diagram illustrating an MFP supporting Wi-Fi Direct according to an embodiment of the present general inventive concept. FIG. 8 illustrates a basic structure of the MFP supporting Wi-Fi direct. The CPU 830 of FIG. 8 may include an IP address manager 835 and a controller 836. In addition, the scanner module 860, the fax module 870, and the print engine 880 are included in an image forming unit 1400.

The WLAN interface unit 810 allows the MFP to be Wi-Fi Direct connected at the same time of being connected to the infrastructure network. The IP address manager 835 manages an IP address of the infrastructured network and an IP address of the Wi-Fi Direct interface. The MFP supports the concurrent connection function as described above, and may have two different IP addresses according to the interfaces in the case where the MFP is connected to both of the infrastructured network and the Wi-Fi Direct. The IP address manager 835 identifies the IP address of each interface and provides the controller 836 with the IP address. The controller 836 receives the IP addresses from the IP address manager 835 and controls execution of the image forming operation requested by an external wireless device. In more detail, when the controller 836 receives a discovery packet from the wireless terminal WI-Fi Direct connected to the MFP through the Wi-Fi Direct interface, the controller 836 receives the IP address of the Wi-Fi Direct interface from the IP address manager 835 to generate a response packet including the IP address and transmit the response packet to the wireless terminal. The wireless terminal analyzes the response packet transmitted from the MFP to get the IP address of the Wi-Fi Direct interface of the MFP. Also, the controller 836 may generate the response packet further including information on services available by the MFP, and in this case, the wireless terminal may determine the services that may be provided by the MFP by analyzing the response packet.

If the controller 836 receives a request to perform an image forming operation the request being transmitted to the destination of which is the IP address of the Wi-Fi Direct interface, from the wireless terminal Wi-Fi Direct connected to the MFP, the controller 836 may allow the image forming unit 1400 to perform the requested image forming operation. For example, if the controller 836 receives print data using the destination of which is the IP address of the Wi-Fi Direct interface, from the wireless terminal, the controller 836 allows the print engine 880 to perform a print operation according to the received print data. When the controller 836 receives a scan request through the destination of which is the IP address of the W-Fi Direct interface, from the wireless terminal, and allows the scanner module 860 to perform the scanning operation.

Figure 15:
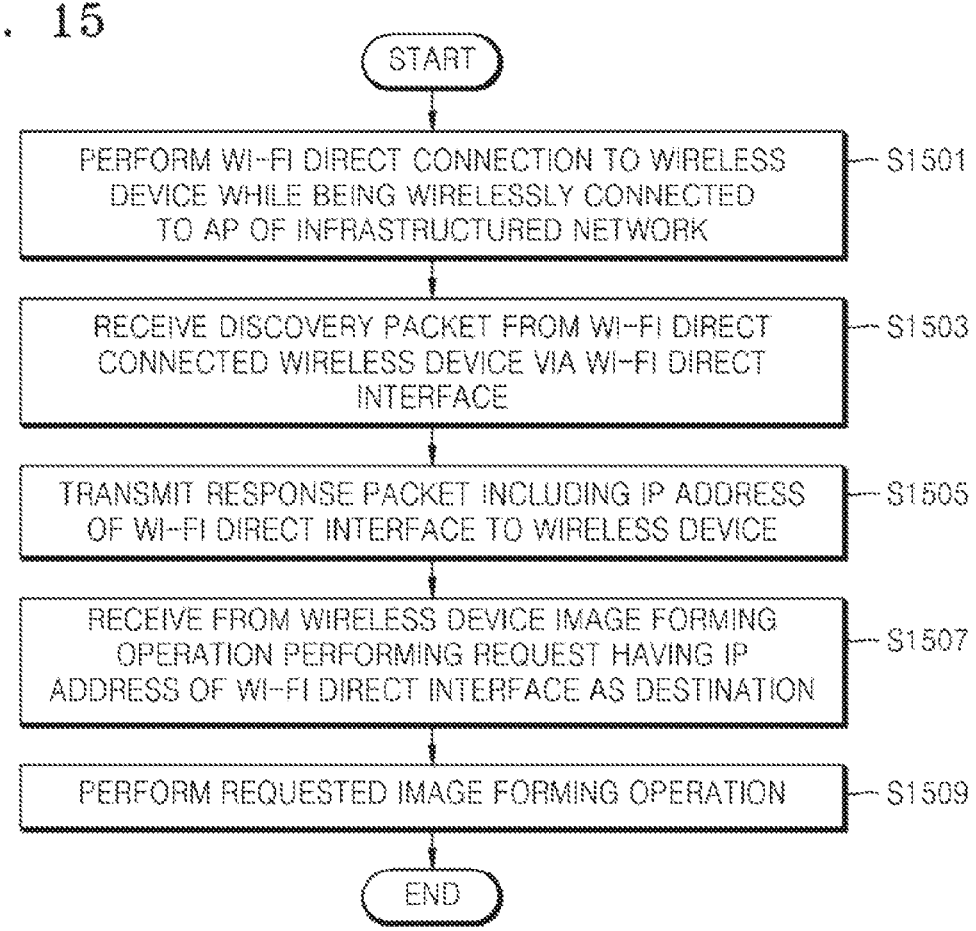
FIG. 15 is a flowchart illustrating a method of performing image forming processes in the multi-function printer supporting Wi-Fi Direct of FIG. 14, according to an embodiment of the present general inventive concept.

FIG. 15 is a flowchart illustrating a method of performing an image forming operation of the MFP supporting W-Fi Direct, according to an embodiment of the present general inventive concept. Referring to FIG. 15, the MFP is W-Fi Direct connected to the wireless terminal in a state of being connected to the AP of the infrastructured network by using the concurrent connection function at operation S1501. The MFP receives a discovery packet from the wireless terminal that is W-Fi Direct connected to the MFP via the W-Fi Direct interface at operation S1503. When the discovery packet from the wireless terminal is received via the WI-Fi Direct interface, the MFP generates a response packet including an IP address of the Wi-Fi Direct interface and transmits the response packet to the wireless terminal at operation S1505. The wireless terminal receiving the response packet may identify the IP address of the W-Fi Direct interface of the MFP by analyzing the response packet. Further, the MFP may generate a response packet including information about available services of the MFP, and in this case, the wireless terminal may identify the kinds of image forming operation services provided by the MFP by analyzing the response packet. When the wireless terminal receiving the response packet transmits a request for executing the image forming operation to a destination of the IP address of the W-Fi Direct interface, the MFP receives the response packet at operation S1507, and performs the requested image forming operation at operation S1509. For example, when print data, the destination of which is the IP address of the W-Fi Direct interface, is received in operation S1507, the printing is performed according to the print data at operation S1509, and if a scanning request, the destination of which is the IP address of the W-Fi Direct interface, is received in operation S1507, the scanning operation is performed at operation S1509.

As described above, the response packet, including the IP address of the Wi-Fi Direct interface, is transmitted to the wireless terminal that is W-Fi Direct connected to the MFP, and when the MFP receives the request to perform the image forming operation, the destination of which is the IP address of the Wi-Fi Direct interface, from the wireless terminal, the MFP performs the request. Thus, the MFP may stably perform the image forming operation requested by the wireless terminal that is W-Fi Direct connected to the MFP in a state of being connected to the infrastructured network and the W-Fi Direct simultaneously.

Figure 16:
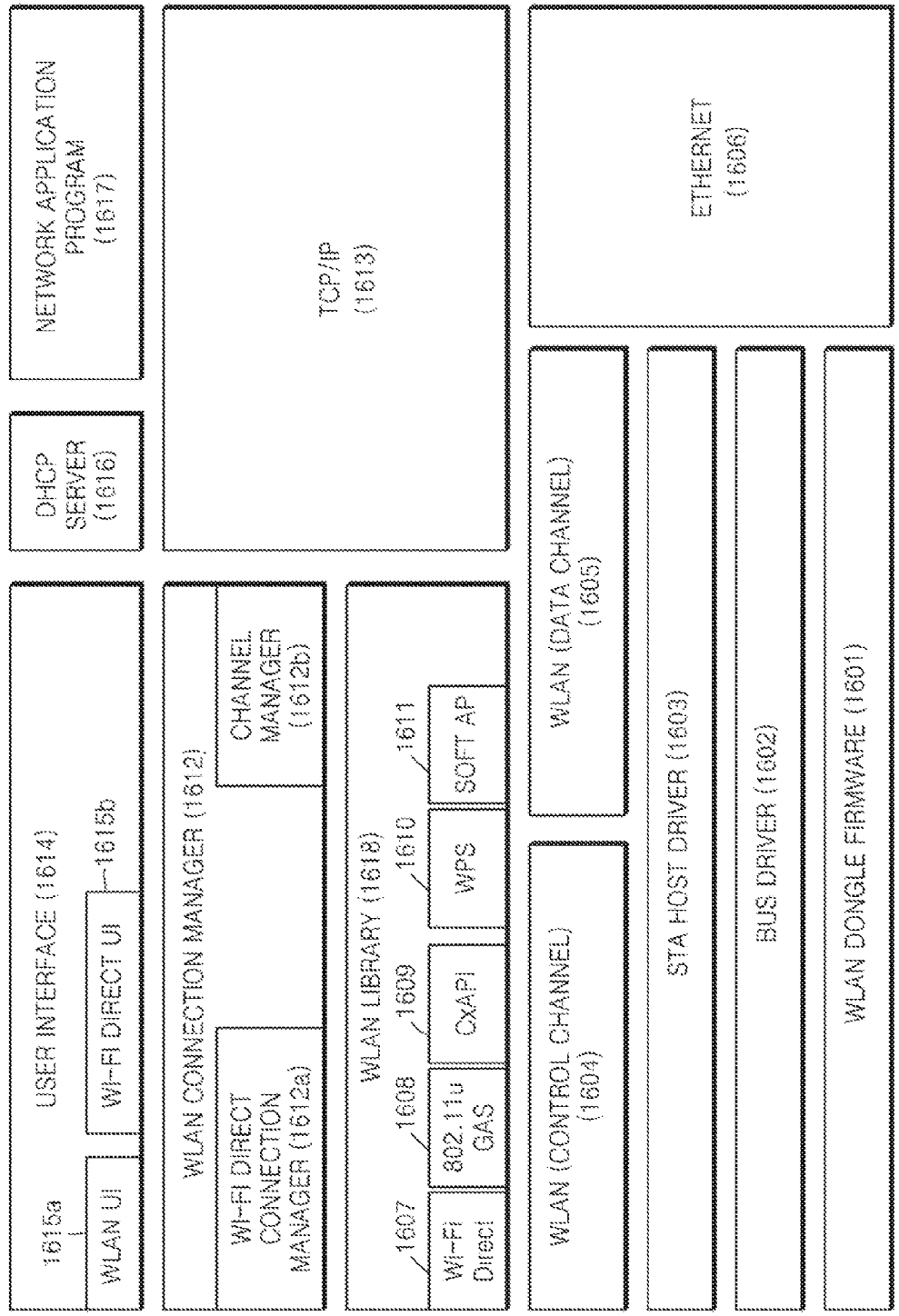
FIG. 16 is a block diagram illustrating a software program configuration of a multi-function printer supporting the W-Fi Direct according to an embodiment of the present general inventive concept.

Hereinafter, a method of managing channels in the MFP supporting W-Fi Direct will be described in detail with reference to the accompanying drawings. FIG. 16 is a block diagram illustrating a software program configuration of the MFP supporting W-Fi Direct according to the embodiment of the present general inventive concept. FIG. 16 illustrates a channel manager 1612b included in a WLAN connection manager 1612 to manage a channel used by the MFP to connect to the infrastructured network AP and a W-Fi Direct operation channel used in the WI-Fi Direct connection.

FIG. 16 also illustrates the similar features to those of FIG. 9. For example, a WLAN dongle firmware 1601 is firmware for connecting the WLAN, and may be stored in WLAN dongle hardware or may be transmitted to the WLAN dongle hardware from a main board of the MFP when booting the MFP. A bus driver 1602 and a STA (station) host driver 1603 are low level bus drivers for communicating with the WLAN hardware. A WLAN controlling channel 1604 and a WLAN data channel 1605 are channels for communicating with the WLAN firmware. A W-Fi Direct module 1607 performs the W-Fi Direct connection and transmits an operating command to the WLAN firmware. An IEEE 802.11u generic advertisement service (GAS) module 1608 performs functions according to IEEE 802.11u GAS, a module 1609 performs functions relating to CxAPI, and a WPS module 1610 performs a WPS function. A soft AP module 1611 is a software module allowing the MFP to perform as the AR. A transmission control protocol (TCP)/IP 1613 is a standard protocol for network transmission. A W-Fi Direct connection manager 1612 is a module for controlling the W-Fi Direct connection. A W-Fi Direct user interface 1615 allows the user to perform settings related to the Wi-Fi Direct, and may be included in a user interface 1614 that is installed in an embedded web server (EWS). A DHCP server 1616 automatically allocates an IP to the W-Fi Direct device that is connected as a client. A network application program 1617 performs various application operations relating to the network.

The method of managing the channels used in the connections by the channel manager 1612b will be described below with reference to FIGS. 18 through 24.

Figure 17:
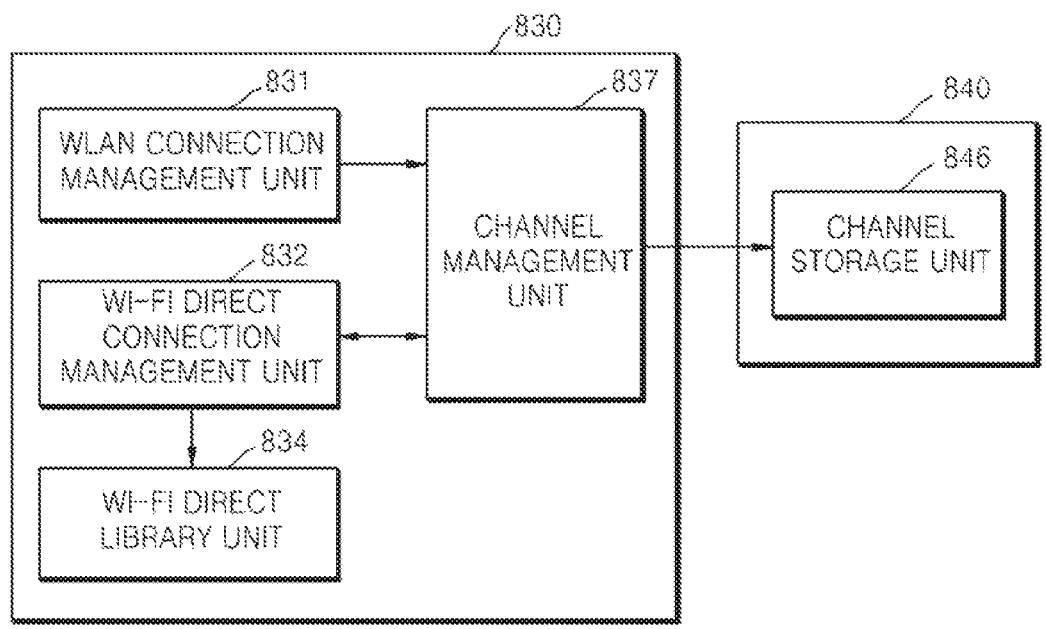
FIG. 17 is a detailed block diagram illustrating a multi-function printer supporting W-Fi Direct according to an embodiment of the present general inventive concept.

FIG. 17 is a block diagram illustrating the MFP supporting W-Fi Direct according to the embodiment of the present general inventive concept. Referring back to FIG. 8 illustrating a basic configuration of the MFP supporting W-Fi Direct, the CPU 830 may include a WLAN connection manager 831, a W-Fi Direct connection manager 832, a W-Fi Direct library unit 834, and a channel manager 837. Also, the memory unit 840 may include a channel storage unit 846 therein. The channel manager 837 identifies the channel used by the MFP to connect to the infrastructured network AP from the WLAN connection manager 831, and identifies the W-Fi Direct operation channel used in the W-Fi Direct connection from the Wi-Fi Direct connection manager 832. In addition, the channel manager 837 makes the channel used in the AP connection and the W-Fi Direct operation channel coincide with each other. Also, the channel manager 837 stores the channel used in the connection to the infrastructured network AP in the channel storage unit 846 so that the stored channel may be set as the W-Fi Direct operation channel when the connection to the infrastructured network AP is disconnected and W-Fi Direct is activated. Since the MFP is mainly used as a fixed device, it is likely to use the channel that has been used to connect to the infrastructured network AP once again. When the W-Fi Direct operation channel is set to be the same as the channel used to connect to the AP by the channel manager 837, the W-Fi Direct connection manager 832 activates W-Fi Direct through the set Wi-Fi Direct operation channel by using the W-Fi Direct library unit 834.

FIGS. 18 through 23 are flowcharts illustrating the method of managing the channels in the MFP supporting W-Fi Direct according to the embodiment of the present general inventive concept. Hereinafter, the channel managing method will be described in detail below with reference to FIGS. 18 through 23.

Figure 18:
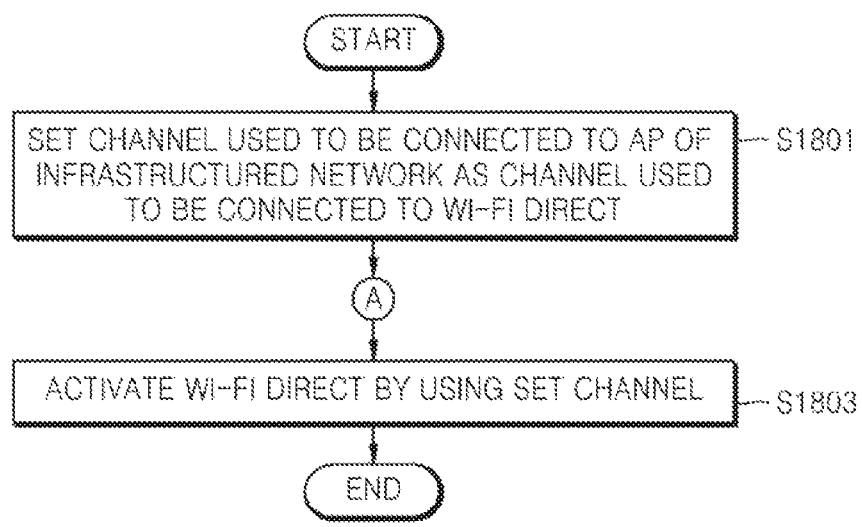
FIGS. 18 through 23 are flowcharts illustrating a method of managing channels in a multi-function printer supporting Wi-Fi Direct according to an embodiment of the present general inventive concept.
Figure 19:
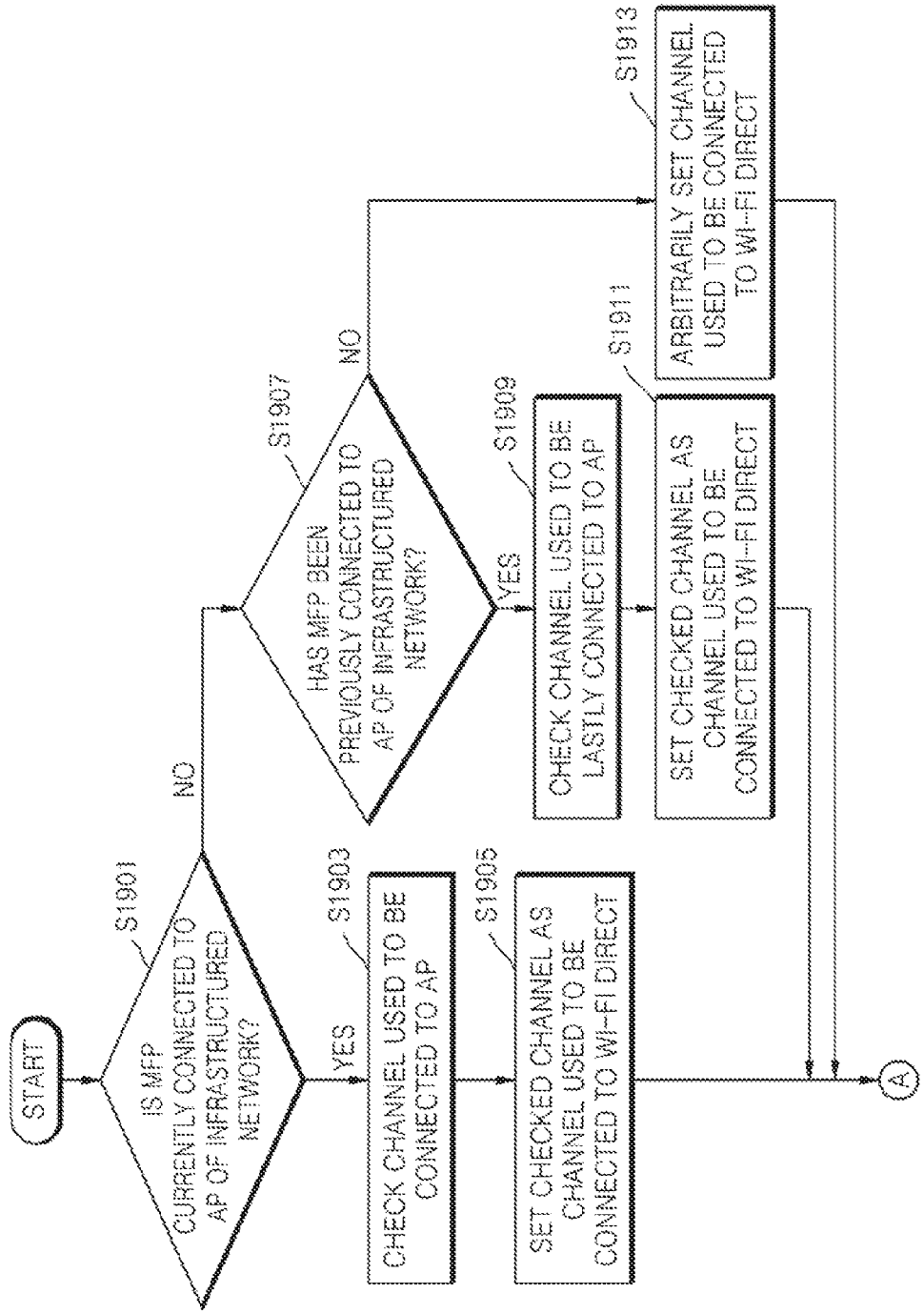

Referring to FIG. 18, a channel that has been used to connect the MFP to the infrastructured network AP is set as the W-Fi Direct operation channel at operation S1801, and W-Fi Direct is activated by using the set channel at operation S1803. Here, sub-processes of operation S1801 of setting the channel used in the connection to the AP as the Wi-Fi Direct operation channel are illustrated in FIG. 19. Referring to FIG. 19, before activating W-Fi Direct, it is determined whether the MFP is connected currently to the infrastructured network AP at operation S1901. As a result of determination, if the MFP is currently connected to the infrastructured network AP, the channel used in the connection to the AP is identified at operation S1903. In addition, the identified channel is set as the Wi-Fi Direct operation channel at operation S1905. However, as a result of the determination in operation S1901, if the MFP is not currently connected to the infrastructured network AP, it is determined whether the MFP has ever been connected to the infrastructured network AP at operation S1907. If the MFP has been connected to the infrastructured network AP, the channel used in the last connection to the AP is identified at operation S1909, and the identified channel is set as the W-Fi Direct operation channel at operation S1911. On the other hand, if the MFP has never been connected to the infrastructured network AP before in operation S1907, an arbitrary channel is set as the W-Fi Direct operation channel at operation S1913.

Figure 20:
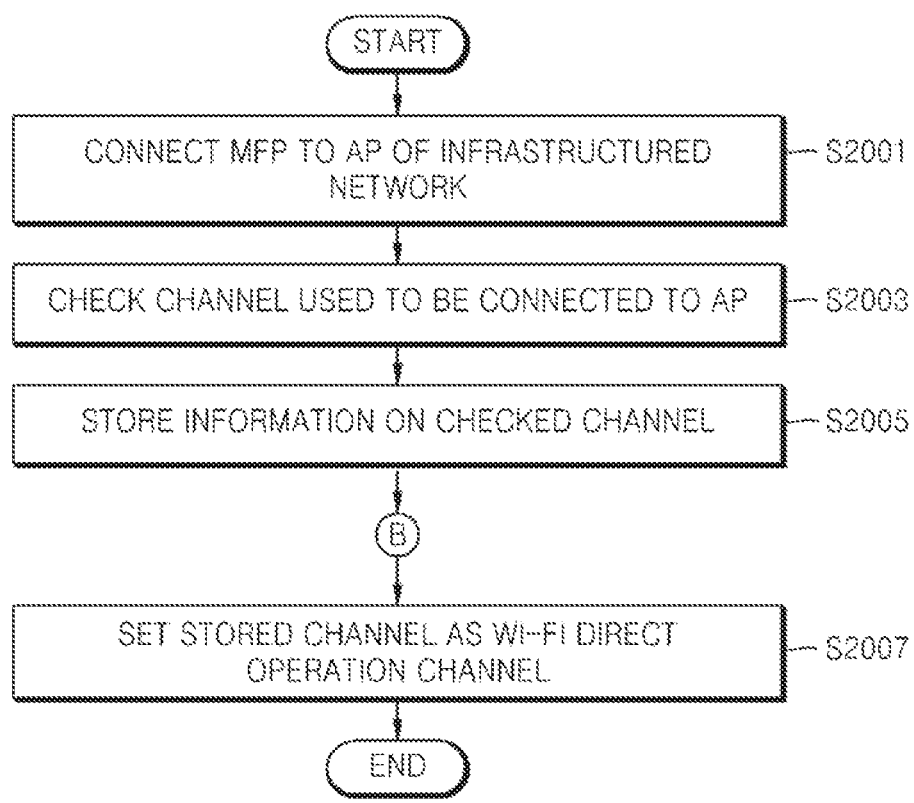
Figure 21:
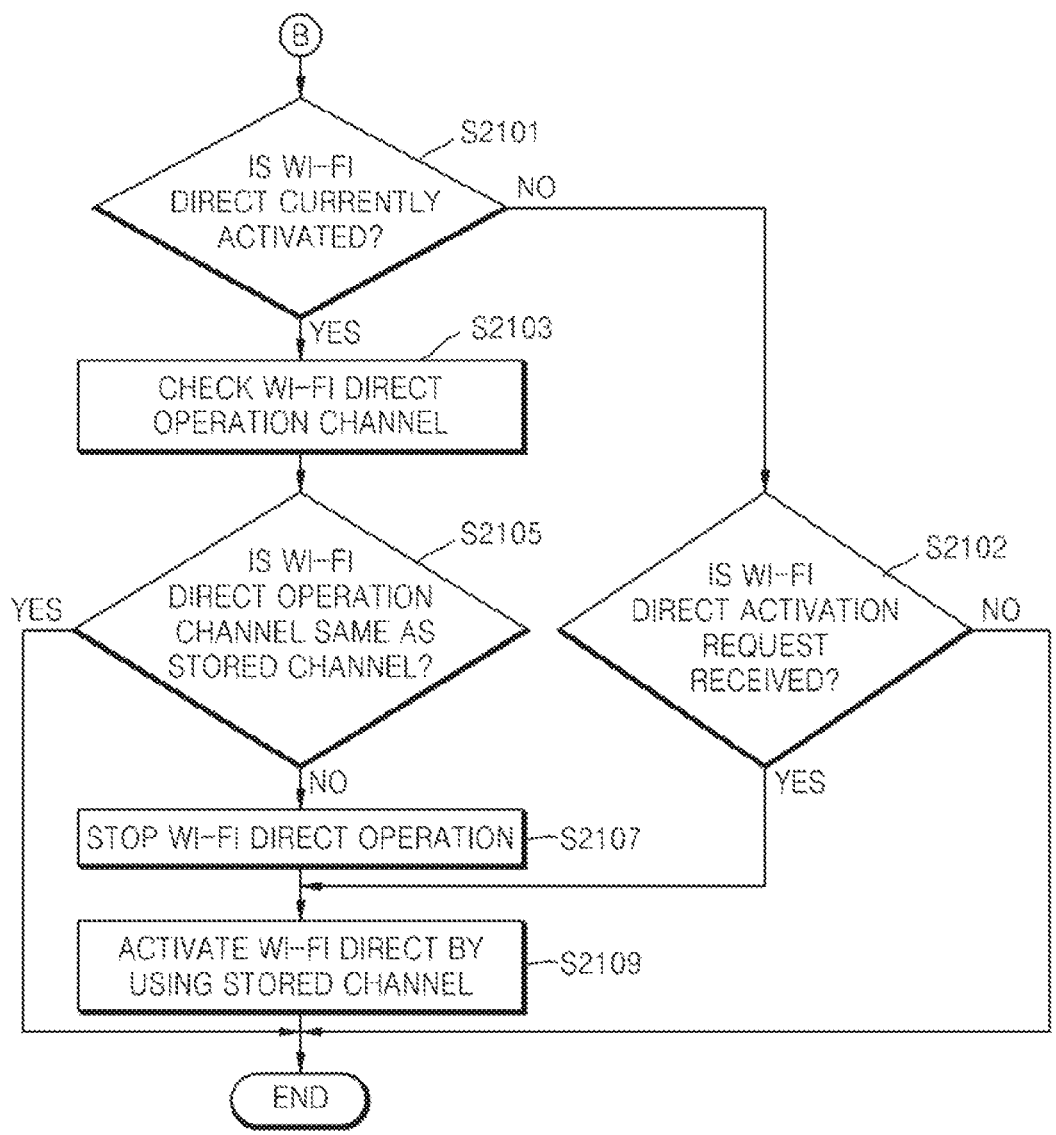
Figure 22:
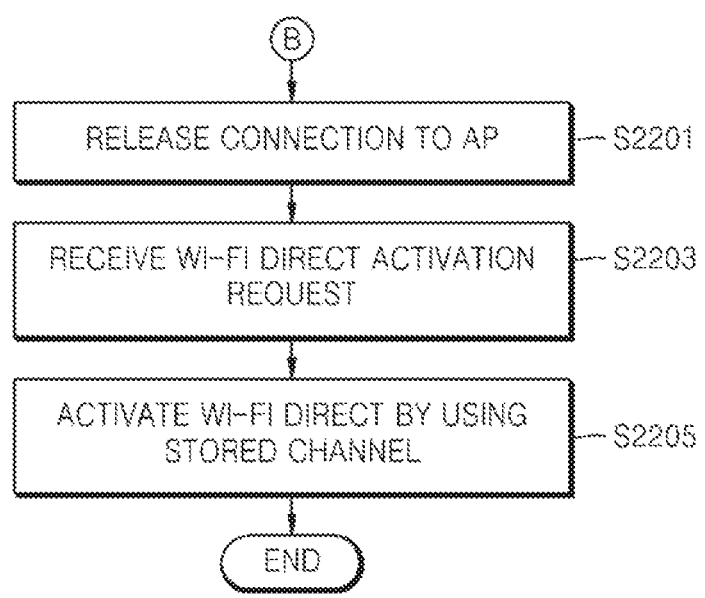

FIGS. 20 through 22 are flowcharts illustrating processes of setting the W-Fi Direct operation channel in a state where the MFP is connected to the AP of the infrastructure network. Referring to FIG. 20, the MFP is connected to the infrastructured network AP at operation S2001, and the channel used in the connection to the AP is identified at operation S2003. The channel identified in operation S2003 is stored at operation S2005, and the stored channel is set as the W-Fi Direct operation channel at operation S2007. Here, sub-processes of operation S2007 for setting the stored channel as the Wi-Fi Direct operation channel are illustrated in FIGS. 21 and 22.

Referring to FIG. 21, after storing the channel identified in operation S2005 of FIG. 20, it is determined whether Wi-Fi Direct is currently activated at operation S2101. As a result of determination, if W-Fi Direct is currently activated, the W-Fi Direct operation channel is identified at operation S2103. In addition, it is determined whether the Wi-Fi Direct operation channel coincides with the stored channel at operation S2105, and if it is determined that the two channels are not the same as each other, the W-Fi Direct operation is stopped at operation S2107, and the stored channel is set as the Wi-Fi Direct operation channel to activate W-Fi Direct at operation S2109. Otherwise, if it is determined that the W-Fi Direct is not currently activated in operation S2101, it is identified whether there is a request for activating W-Fi Direct at operation S2102, and if there is a request, the stored channel is set as the W-Fi Direct operation channel to activate W-Fi Direct at operation S2109.

As another example of the sub-processes of operation S2007 of FIG. 20, referring to FIG. 22, after storing the channel identified in operation S2005 illustrated in FIG. 20, the connection between the MFP and the infrastructured network AP is disconnected at operation S2201. In addition, when the MFP receives a W-Fi Direct activation request at operation S2203, the stored channel is set as the W-Fi Direct operation channel to activate W-Fi Direct at operation S2205.

Figure 23:
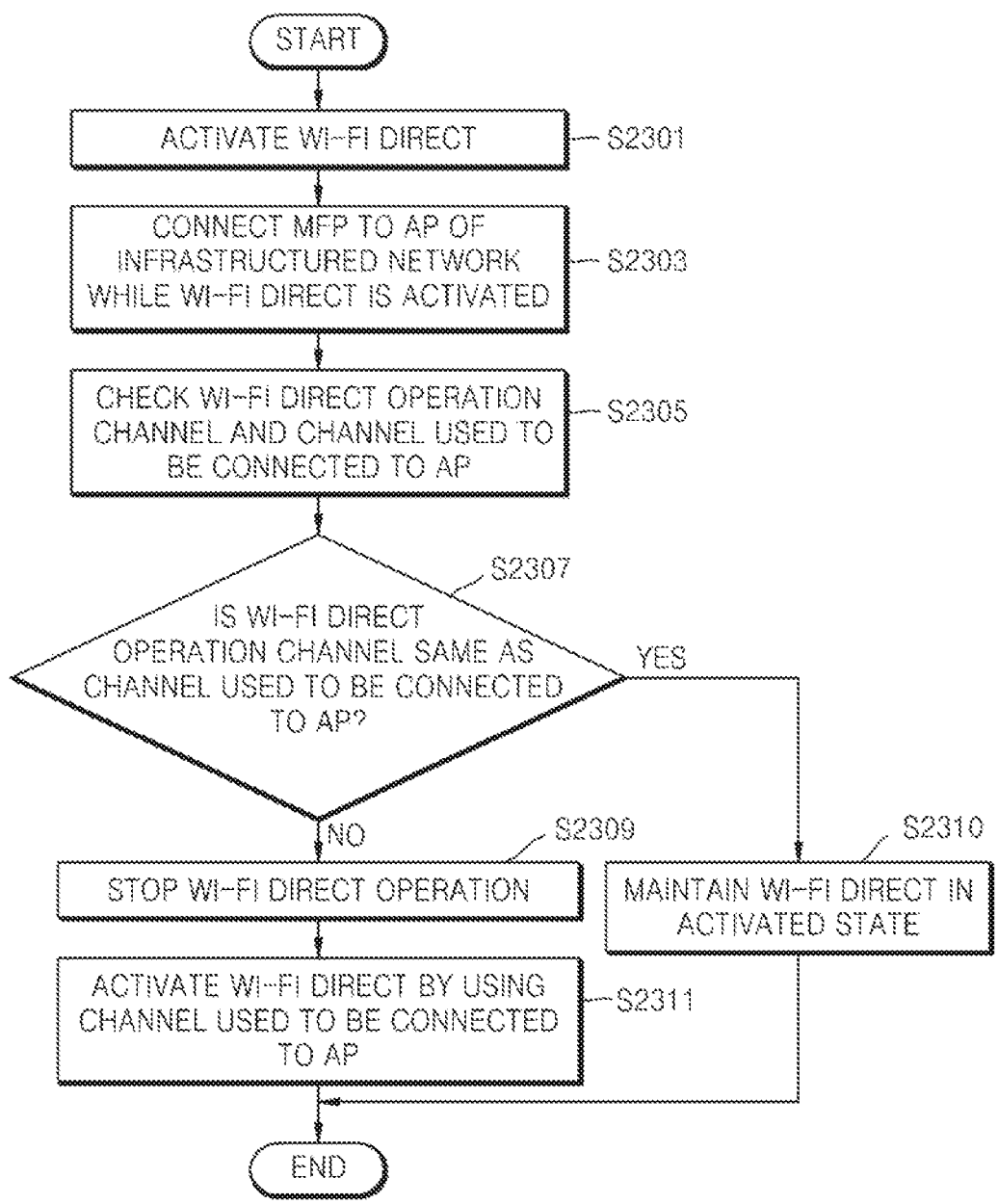

FIG. 23 is a flowchart illustrating processes of setting the Wi-Fi Direct operation channel in a state where W-Fi Direct of the MFP is activated. Referring to FIG. 23, W-Fi Direct of the MFP is activated at operation S2301, and the MFP is connected to the infrastructured network AP in a state where Wi-Fi Direct is activated at operation S2303. The W-Fi Direct operation channel and the channel used in the connection to the AP are identified at operation S2305. It is determined whether the W-Fi Direct operation channel is the same as the channel used in the connection to the AP at operation S2307, and if it is determined that the two channels are not the same as each other, the W-Fi Direct operation is stopped at operation S2309, and the channel used in the connection to the AP is set as the W-Fi Direction operation channel to activate W-Fi Direct at operation S2311.

The above processes will be described in detail with reference to FIG. 16 below. If the MFP is connected to the AP operating in channel 6 at 2.4 GHz when the Wi-Fi Direct operation channel is channel 1 at 2.4 GHz, the channel manager 1612b reads out the channel of the connected AP via the WLAN library 1618 from a wireless module and notifies the W-Fi Direct manager 1612a of the read channel so that the W-Fi Direct operation channel is changed to the channel 6. The W-Fi Direct manager 1612a performs a preliminary operation of changing the channel, such as termination of the soft AP, change of an information element, and termination of a device discovery operation, and then, changes the W-Fi Direct operation channel to the channel 6 to activate W-Fi Direct.

In general, since a wireless MFP performs transmission via one wireless antenna, the wireless MFP has to communicate by using one communication channel at once. Therefore, when a concurrent connection function, in which the MFP is simultaneously connected to the infrastructured network and the Wi-Fi Direct, is performed, there may be a problem in using the communication function. If two different channels are used in the connection to the infrastructured network and the Wi-Fi Direct connection, a wireless chipset of superior CPU performance may process all of the packets while continuously reciprocating two channels in a time-division manner; however, services of each of the channels may be delayed and stability of the channels may be degraded. However, according to the method of managing the channels of the present embodiment, a single channel is used in the concurrent connection, and thus, the above problems may be addressed. Also, the channel of the infrastructured network AP is not known to the MFP before the MFP is connected to the AP; however, according to the present embodiment, even when the MFP is connected to the infrastructured network AP in a state where W-Fi Direct is activated first, the channel information of the AP is read and the Wi-Fi Direct operation channel is set according to the AP channel information so as to use a single channel.

Hereinafter, a method of changing an operation mode in the MFP supporting Wi-Fi Direct will be described below with reference to the accompanying drawings. There may be two WLAN usage modes of the MFP, that is, an ad-hoc mode and an infrastructured network mode. The ad-hoc mode is a mode in which the MFP is wirelessly connected to the wireless device by using ad-hoc communication, and the infrastructured network mode is a mode in which the MFP is wirelessly connected to the infrastructured network AP.

Figure 24:
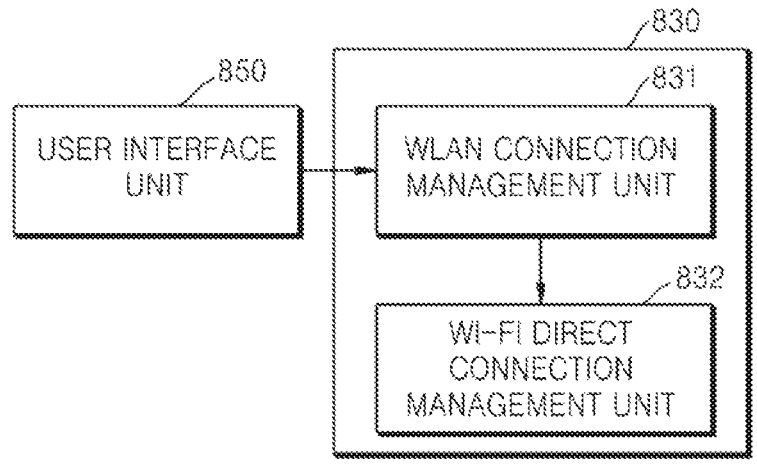
FIG. 24 is a detailed block diagram illustrating a multi-function printer supporting W-Fi Direct according to an embodiment of the present general inventive concept.

FIG. 24 is a block diagram illustrating the MFP supporting W-Fi Direct according to the embodiment of the present general inventive concept. FIG. 8 illustrates a basic configuration of the MFP supporting W-Fi Direct. Referring to FIGS. 8 and 24, the CPU 830 may include the WLAN connection manager 831 and the W-Fi Direct connection manager 832. Detailed operations of each of the components will be described below with reference to FIGS. 25 through 27.

Figure 25:
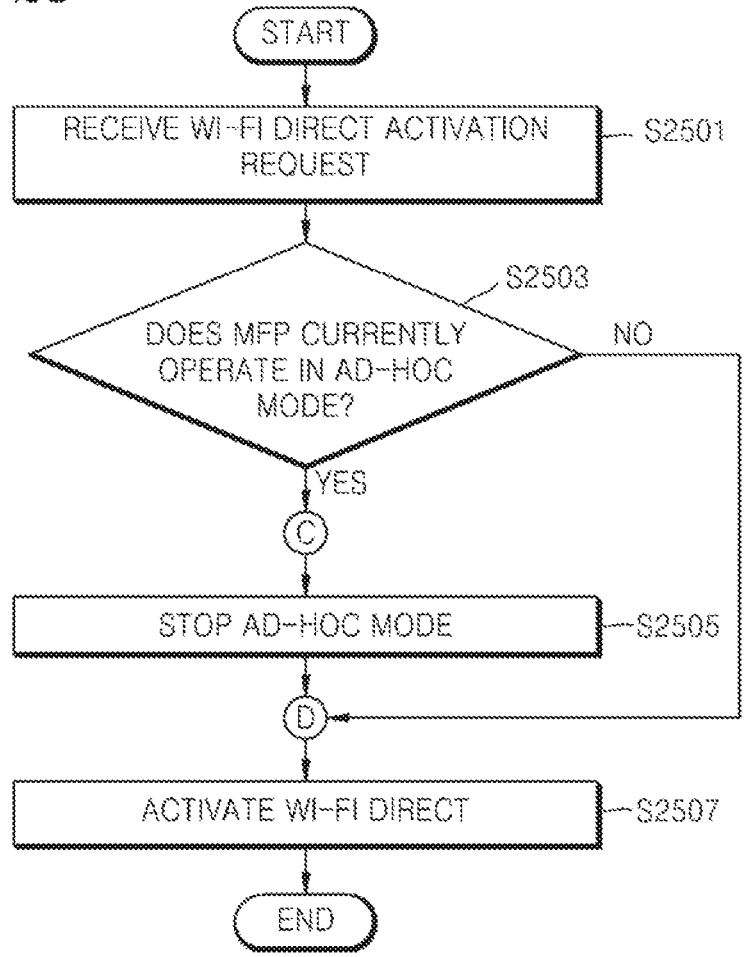
FIGS. 25 through 27 are flowcharts illustrating a method of changing an operation mode in the multi-function printer supporting W-Fi Direct according to an embodiment of the present general inventive concept.
Figure 26:
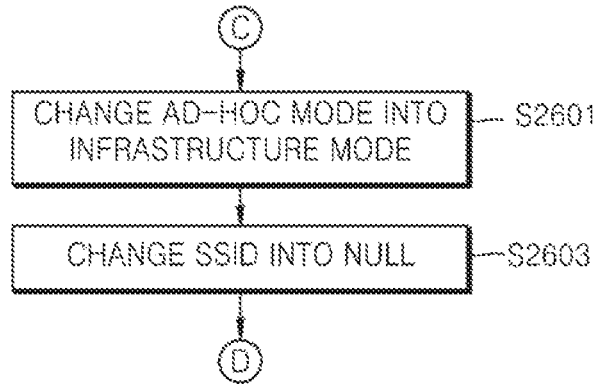
Figure 27:
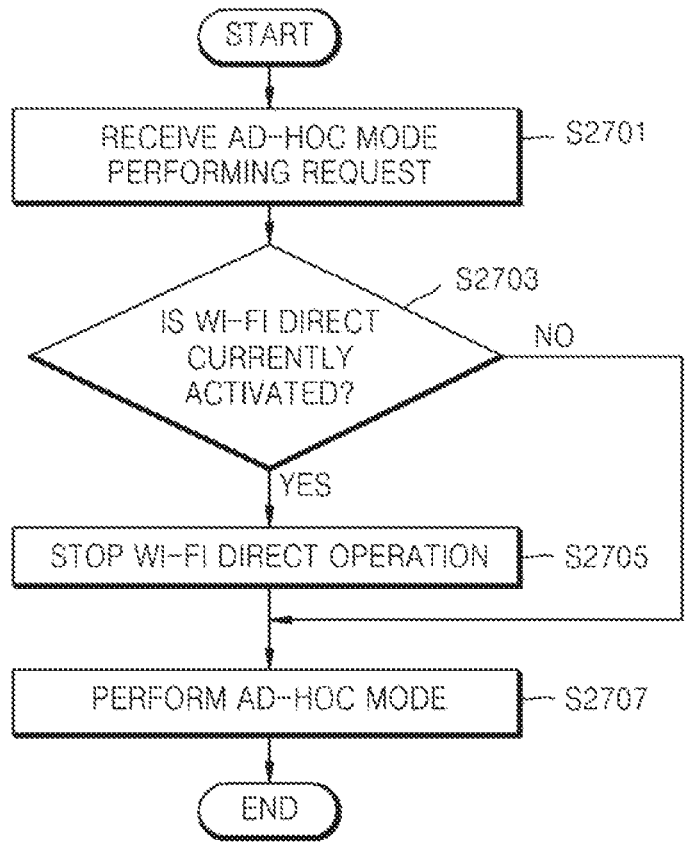

FIGS. 25 through 27 are flowchart illustrating a method of changing the operation mode of the MFP supporting W-Fi Direct, according to the embodiment of the present general inventive concept. Referring to FIG. 25, when a Wi-Fi Direct activation request is transmitted from a user via the user interface module 850 at operation S2501, the WLAN connection manager 831 determines whether the MFP currently operates in the ad-hoc mode at operation S2503. If it is determined that the MFP currently operates in the ad-hoc mode, the WLAN connection manager 831 terminates the ad-hoc mode and requests the W-Fi Direct connection manager 832 to activate W-Fi Direct at operation S2505. The W-Fi Direct connection manager 832 activates W-Fi Direct according to the request at operation S2507. Here, sub-processes of operation S2505 in which the WLAN connection manager 831 terminates the ad-hoc mode are illustrated in FIG. 26. Referring to FIG. 26, the WLAN connection manager 831 may change the operation mode of the MFP from the ad-hoc mode to the infrastructured network mode at operation S2601. Here, the WLAN connection manager 831 may only terminate the ad-hoc mode without changing the operation mode to the infrastructured network mode. The SSID of the MFP, which is set for executing the ad-hoc mode, may be changed to a null state in order to terminate the ad-hoc mode at operation S2603.

Referring to FIG. 27, when an ad-hoc mode execution request is received via the user interface module 850 at operation S2701, the WLAN connection manager 831 determines whether W-Fi Direct of the MFP is currently activated at operation S2703. As a result of the determination, if the Wi-Fi Direct of the MFP is currently activated, the WLAN connection manager 831 requests the W-Fi Direct connection manager 832 to terminate the W-Fi Direct operation. Accordingly, when the W-Fi Direct connection manager 832 terminates the Wi-Fi Direct operation at operation S2705, the WLAN connection manager 831 executes the ad-hoc mode at operation S2707.

Although the W-Fi Direct technology supports the concurrent connection function to the infrastructured network and the Wi-Fi Direct, there may be a limitation, that is, the MFP may not be connected to the Wi-Fi Direct while operating in the ad-hoc mode. The ad-hoc mode may ensure mutual compatibility between devices under IEEE 802.11b; however, Wi-Fi Direct does not support IEEE 802.11b. Therefore, when there is a request to execute the W-Fi Direct mode or the ad-hoc mode while operating in the ad-hoc mode or the Wi-Fi Direct mode, a method of selectively changing the operation mode is necessary, as provided in the embodiments of the present general inventive concept.

According to the present general inventive concept, when activating W-Fi Direct according to the initialization command, the MFP may operate as a GO even if the MFP is not connected to other W-Fi Direct devices in order to form the W-Fi Direct network in advance, so that the MFP may provide connections to legacy wireless terminals that do not support W-Fi Direct. Also, the MFP that is a fixed type device may perform as the GO that has a relatively large power consumption.

Also, when the Wi-Fi Direct activation request is received while operating in the ad-hoc mode, the ad-hoc mode is terminated and W-Fi Direct is activated, and accordingly, a problem that the W-Fi Direct connection is not possible while operating in the ad-hoc mode may be addressed.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus supporting peer to peer (P2P) connection, comprising:
   an image forming device configured to perform an image forming operation;
   a user interface configured to receive a user input;
   a wireless communication interface configured to connect the image forming apparatus to a mobile device by P2P connection;
   a controller configured to set a group owner (GO) setting value, which is related to P2P connection, based on the user input received through the user interface, and to allow the wireless communication interface to function as an access point (AP) if the GO setting value is in an on state;
   wherein, if the wireless communication interface functions as the AP, the wireless communication interface allows more than one mobile device to be connected to the image forming apparatus by P2P connection.

2. The image forming apparatus of claim 1, wherein the wireless communication interface comprises:
   a first wireless interface to connect the image forming apparatus to an access point (AP) of an infrastructure network; and
   a second wireless interface to connect the image forming apparatus to the mobile device by P2P connection.

3. The image forming apparatus of claim 2, wherein the controller controls the wireless communication interface to connect the image forming apparatus to the AP of the infrastructure network and the mobile device by using a single channel.

4. The image forming apparatus of claim 3, further comprising a memory to store data,
   wherein the controller stores a channel used in a connection via the first interface when the connection is established, and connects the image forming apparatus to the mobile device via the second wireless interface by using the stored channel.

5. The image forming apparatus of claim 1, wherein the controller generates an identifier (ID) of the image forming apparatus and a password which are to be used for functioning as the AP if the GO setting value is in the on.

6. The image forming apparatus of claim 1 wherein the image forming apparatus functions as the AP without having a negotiation with the P2P connected mobile device if the GO setting value is in the on state.

7. The image forming apparatus of claim 1, wherein if the GO setting value is in an off state, the controller performs a P2P device discovery, and updates a state of P2P connection.

8. The image forming apparatus of claim 1, wherein
   a dynamic host configuration protocol (DHCP) server module is installed in the image forming apparatus,
   the DHCP server module allocates an internet protocol (IP) address to the mobile device connected by P2P connection, and
   the controller activates the DHCP server module if the GO setting value is in the on state.

9. The image forming apparatus of claim 1, wherein, if the GO setting value is in an off state, the controller determines whether to allow the image forming apparatus to perform as the AP based on a result of a negotiation between the image forming apparatus and the mobile device.

10. The image forming apparatus of claim 9, wherein
    a dynamic host configuration protocol (DHCP) server module is installed in the image forming apparatus,
    the DHCP server module allocates an internet protocol (IP) address to the mobile device connected by P2P connection, and
    the controller activates the DHCP server module if the image forming apparatus is selected as the AP through the negotiation.

11. The image forming apparatus of claim 1, wherein
    the GO setting value is set as the on state automatically in response to receiving a Wi-Fi Direct initialization command from the user, and
    the controller sets a Wi-Fi Direct connection between the image forming apparatus and a mobile device without performing negotiation for selecting the GO.

12. A non-transitory computer-readable recording medium having embodied thereon a program to execute a method comprising:
    displaying a screen for setting a group owner (GO) setting value, which is related to peer to peer (P2P) connection, of an image forming apparatus;
    determining, by the image forming apparatus, whether P2P connection function is turned on;
    driving a wireless communication interface of the image forming apparatus to function as an access point (AP) if the P2P connection function is turned on and the GO setting value is in an on state; and
    activating P2P connection between the image forming apparatus and more than one mobile device if the wireless communication interface functions as the AP.

13. The non-transitory computer-readable recording medium of claim 12, wherein activating P2P connection comprises:
    connecting the image forming apparatus to an access point (AP) of an infrastructure network;
    storing a channel used in a connection between the image forming apparatus and the AP; and
    connecting the image forming apparatus to the more than one mobile device by using the stored channel.

14. The non-transitory computer-readable recording medium of claim 12, further comprising:
    generating an identifier (ID) of the image forming apparatus and a password which are to be used for functioning as the AP if the GO setting value is in the on state.

15. The non-transitory computer-readable recording medium of claim 12,
    wherein driving the wireless communication interface to function as the AP is performed without having a negotiation between the image forming apparatus and a P2P connected mobile device.

16. The non-transitory computer-readable recording medium of claim 12, wherein
    the GO setting value is set as the on state automatically in response to receiving a Wi-Fi Direct initialization command from a user, and
    activating the P2P connection comprises setting a Wi-Fi Direct connection between the image forming apparatus and a mobile device without performing negotiation for selecting the GO.

* * * * *